(12) United States Patent
Kobayashi

(10) Patent No.: US 7,356,034 B2
(45) Date of Patent: Apr. 8, 2008

(54) TERMINAL DEVICE, METHOD FOR PROCESSING COMMUNICATION DATA INSIDE THE TERMINAL DEVICE, AND PROGRAM FOR IMPLEMENTING THE METHOD

(75) Inventor: Yoshikazu Kobayashi, Kanagawa (JP)

(73) Assignee: NEC Infrontia Corporation (JP)

( * ) Notice: Subject to any disclaimer, the term of this patent is extended or adjusted under 35 U.S.C. 154(b) by 871 days.

(21) Appl. No.: 10/649,724

(22) Filed: Aug. 28, 2003

(65) Prior Publication Data
US 2004/0073946 A1  Apr. 15, 2004

(30) Foreign Application Priority Data
Oct. 1, 2002  (JP) .............................. 2002-288892

(51) Int. Cl.
| | |
|---|---|
| H04L 12/26 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl. ...................... 370/392; 370/229; 370/468; 709/250; 725/132

(58) Field of Classification Search ........ 370/352–392, 370/229–252, 401–412, 468–474; 709/230–250
See application file for complete search history.

(56) References Cited

U.S. PATENT DOCUMENTS

| | | | | |
|---|---|---|---|---|
| 5,481,735 A * | 1/1996 | Mortensen et al. | ......... | 709/246 |
| 5,898,889 A * | 4/1999 | Davis et al. | ................... | 710/29 |
| 6,101,543 A * | 8/2000 | Alden et al. | ................. | 709/229 |
| 6,226,680 B1 * | 5/2001 | Boucher et al. | ............ | 709/230 |
| 6,449,251 B1 * | 9/2002 | Awadallah et al. | ......... | 370/229 |
| 6,640,248 B1 * | 10/2003 | Jorgensen | ................... | 709/226 |

(Continued)

FOREIGN PATENT DOCUMENTS

JP  7-273789  10/1995

(Continued)

OTHER PUBLICATIONS

Japanese Office Action issued Feb. 7, 2006 (w/English translation of relevant portions).

*Primary Examiner*—Man U. Phan
(74) *Attorney, Agent, or Firm*—Dickstein, Shapiro, LLP.

(57) ABSTRACT

A terminal device, includes: a device driver section for controlling an interface section that is connected to a network; a protocol stack section that is connected to the network via the device driver section based on a communication protocol at higher than or equal to layer3 of OSI; and a middleware section that is interposed between the protocol stack section and the device driver section. If a send request for a frame to be sent is issued from the protocol stack section, the middleware section determines a priority of the send request based on header information at layer2 to layer4 of OSI within the send frame, and outputs the send request to the device driver section according to the priority determined. Also, if a receive request for a frame to be received is issued from the device driver section, the middleware section determines a priority of the receive request based on header information at layer2 to layer4 of OSI within the receive frame, and outputs the receive request to the protocol stack section according to the priority determined.

38 Claims, 17 Drawing Sheets

U.S. PATENT DOCUMENTS

| | | |
|---|---|---|
| 6,807,581 B1 * | 10/2004 | Starr et al. .................. 709/250 |
| 7,031,310 B2 * | 4/2006 | Ando et al. .................. 370/392 |
| 7,069,260 B2 * | 6/2006 | Yanosy ........................ 706/47 |
| 7,076,552 B2 * | 7/2006 | Mandato ..................... 709/226 |
| 7,076,568 B2 * | 7/2006 | Philbrick et al. ........... 709/250 |
| 2001/0037406 A1 | 11/2001 | Philbrick et al. |
| 2002/0141446 A1 * | 10/2002 | Koga ......................... 370/468 |
| 2003/0188031 A1 * | 10/2003 | Deikman et al. ........... 709/250 |

FOREIGN PATENT DOCUMENTS

| | | |
|---|---|---|
| JP | 11-32078 | 2/1999 |
| JP | 2000-32956 | 2/2000 |
| JP | 2001-156793 | 6/2001 |
| WO | WO-97/41674 | 11/1997 |
| WO | WO-01/45328 A1 | 6/2001 |

* cited by examiner

FIG. 9
(1)
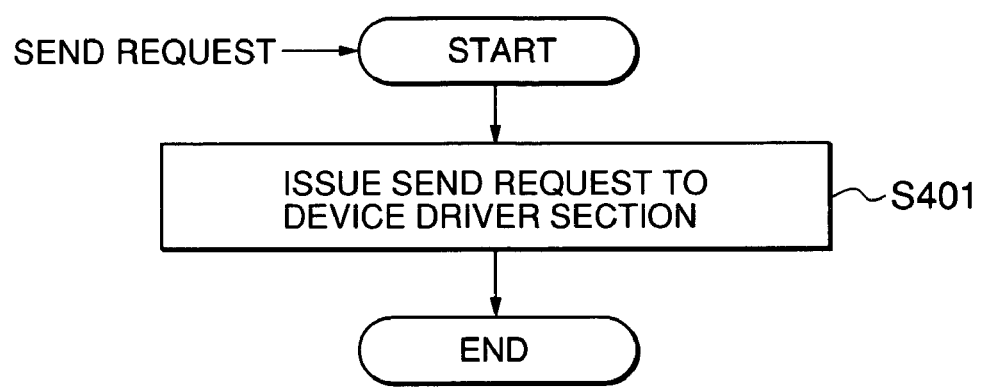
(2)
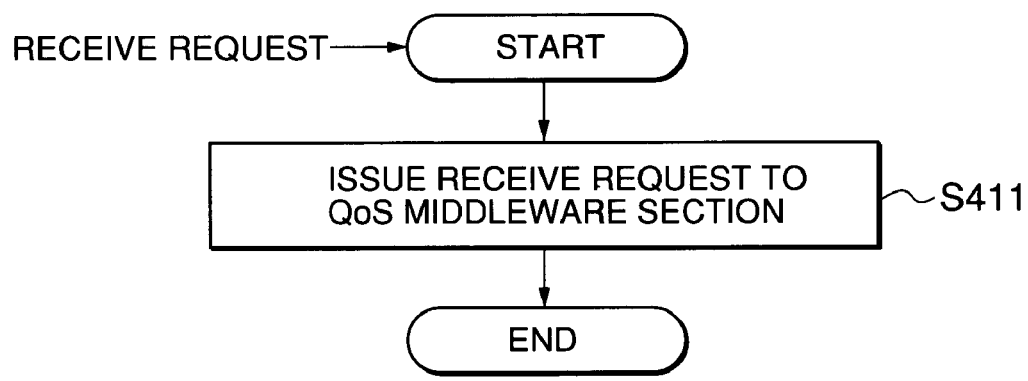

TERMINAL DEVICE, METHOD FOR PROCESSING COMMUNICATION DATA INSIDE THE TERMINAL DEVICE, AND PROGRAM FOR IMPLEMENTING THE METHOD

BACKGROUND OF THE INVENTION

1. Field of the Invention

The present invention relates to a terminal device, a method for processing communication data inside the terminal device, and a program for implementing the method. In particular, the present invention relates to a terminal device, a method for processing communication data inside the terminal device, and a program for implementing the method, which serve to send/receive a packet.

2. Description of the Related Art

An example of a conventional interface control section placed between a protocol stack and a device driver is disclosed in JP 2001-156793 A. The interface control section of JP 2001-156793 A analyzes a Media Access Control (hereinafter, referred to as "MAC") address at layer2 of Open Systems Interconnection (hereinafter, referred to as "OSI") sent/received via the device driver, and sends the MAC address to the protocol stack or the device driver.

In the case of sending/receiving a packet for a high-priority communication protocol at higher than or equal to layer3 of OSI (for example, video data sent as a Real-time Transport Protocol (hereinafter, referred to as "RTP") packet), it is necessary to eliminate loss of time. Interface processing of JP 2001-156793 A is performed in a requested order irrespective of whether requests are sent from the device driver or the protocol stack. Therefore, as the load increases, the processing for sending/receiving the packet for a high-priority communication protocol is increasingly delayed in the protocol stack or the device driver.

SUMMARY OF THE INVENTION

The present invention therefore has an object to put a high priority on receiving processing in a protocol stack and/or sending processing in a device driver with respect to a specific packet assigned a high priority with as small delay as possible.

According to a specific example of the present invention, there is provided a terminal device including: a device driver section for controlling an interface section that is connected to a network; a protocol stack section that is connected to the network via the device driver section based on a communication protocol at higher than or equal to layer3 of OSI; and a middleware section that is interposed between the protocol stack section and the device driver section, in which the middleware section includes a sending section that, if a send request for a frame to be sent (hereinafter, referred to as "send frame") is issued from the protocol stack section, determines a send priority of the send request based on header information at layer2 to layer4 of OSI within the send frame, and then outputs the send request to the device driver section according to the send priority determined.

According to a specific example of the present invention, there is provided a method for processing communication data inside a terminal device that includes: a device driver section for controlling an interface section that is connected to a network; and a protocol stack section that is connected to the network via the device driver section based on a communication protocol at higher than or equal to layer3 of OSI, the method including: (a) if a send request for a send frame is issued from the protocol stack section, determining a send priority of the send request based on header information at layer2 to layer4 of OSI within the send frame; and (b) outputting the send request to the device driver section according to the send priority determined.

According to a specific example of the present invention, there is provided a program capable of being executed by a computer that includes: a device driver section for controlling an interface section that is connected to a network; and a protocol stack section that is connected to the network via the device driver section based on a communication protocol at higher than or equal to layer3 of OSI, the program including: (a) a process for, if a send request to a predetermined destination for a specific packet defined by a communication protocol at higher than or equal to layer5 of OSI is issued from the protocol stack section in advance and if the send request is a first one of consecutive send requests, checking on header information of the specific packet, then registering into a cache table session information extracted from headers at layer2 to layer4 of OSI within a send frame carrying the specific packet, raising a send priority of the send request, and outputting the send request to the device driver section; and (b) a process for, if the send request is among the consecutive send requests other than the first one and if session information extracted from headers at layer2 to layer4 of OSI within a send frame carrying the specific packet is registered in the cache table, raising a send priority of the send request, and outputting the send request to the device driver section.

BRIEF DESCRIPTION OF THE DRAWINGS

The above and other objects, features and advantages of the present invention will become apparent from the following detailed description when taken with the accompanying drawings in which:

FIGS. 9(1) and 9(2) are flow charts showing operations of a pseudo protocol stack section of FIG. 2;

DETAILED DESCRIPTION OF THE PREFERRED EMBODIMENTS

Figure 1:
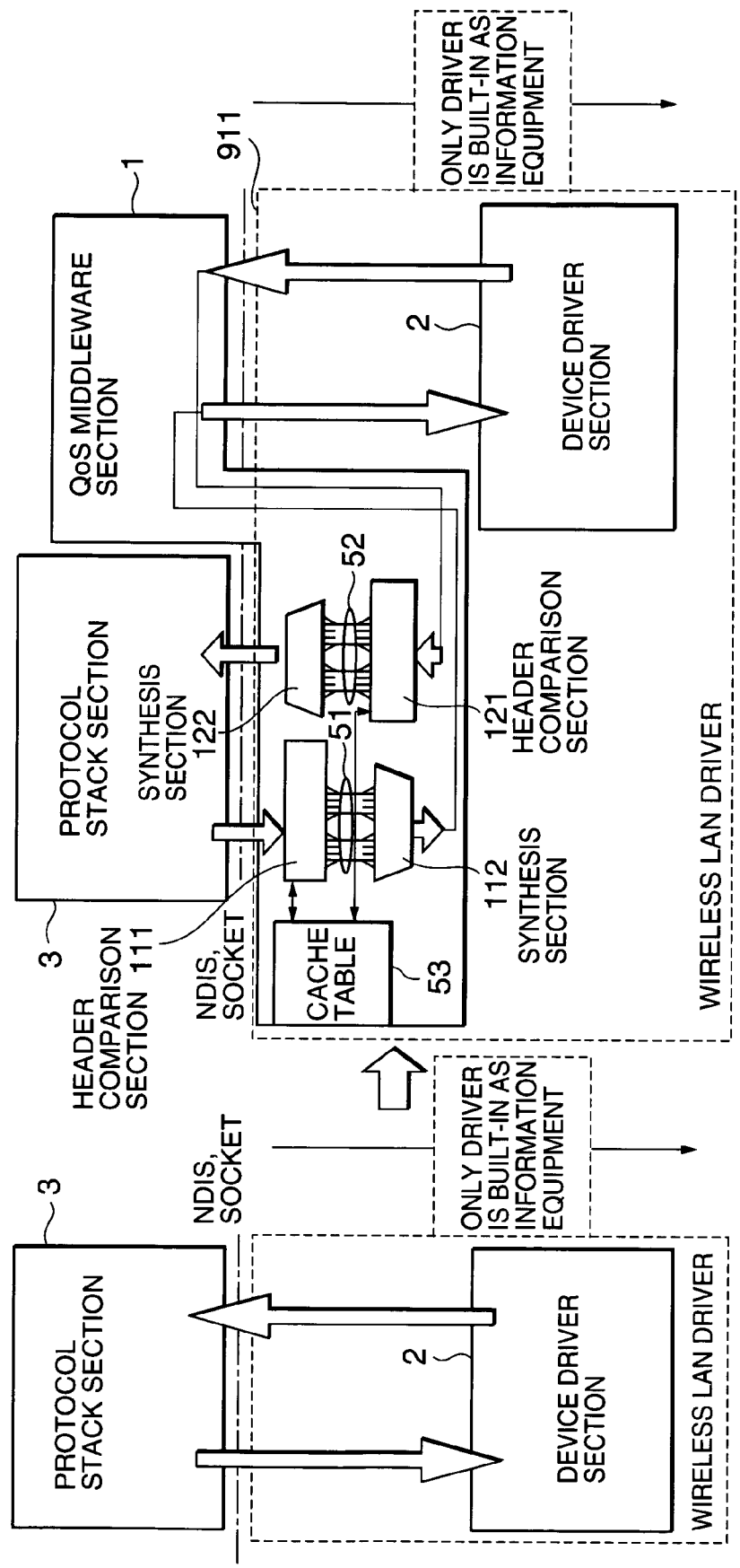
FIG. 1 is a schematic block diagram showing a configuration of the present invention.

FIG. 1 is first used to describe an outline of a configuration of the present invention.

According to the present invention, middleware is interposed between a client driver and a higher-level application driver to thereby realize Quality of Service (hereinafter, referred to as "QoS") of a wireless LAN. That is, a QoS middleware section 1 as the middleware is interposed between a device driver section 2 as a device driver for a LAN and a protocol stack section 3 at higher than or equal to layer3 of OSI Reference Model such as Transmission Control Protocol/Internet Protocol (hereinafter, referred to as "TCP/IP") for realizing LAN communication at higher than or equal to layer3 of OSI.

The QoS middleware section 1 includes a sending section for passing receive data received from the protocol stack section 3 to the device driver section 2 for the LAN. The sending section includes a header comparison section 111 for directing send data toward multiple First In First Outs (hereinafter, referred to as "FIFOs") included in a send FIFO section 51, and a synthesis section 112 for synthesizing send requests for the send data outputted from the multiple FIFOs. Priorities are previously assigned to the multiple FIFOs. The header comparison section 111 compares information previously registered in a cache table 53 with session information extracted from each header information within a frame to be sent, to thereby determine the priority of the send data. The header comparison section 111 then queues the send request (send event) for the data to a FIFO conformed with the determined priority, so that predetermined high-priority data is sent to the wireless LAN. Note that the present invention is not limited to the wireless LAN, and may be applied to a low-speed communication line or other types of LAN communication.

In addition, the present invention may include a receiving section for passing receive data received from the device driver section 2 to the protocol stack section 3 at higher than or equal to layer3 such as TCP/IP. Similarly to the sending section, the receiving section includes a header comparison section 121, a receive FIFO section 52 having multiple FIFOs, and a synthesis section 122, thereby offering QoS to the receive data.

Figure 2:
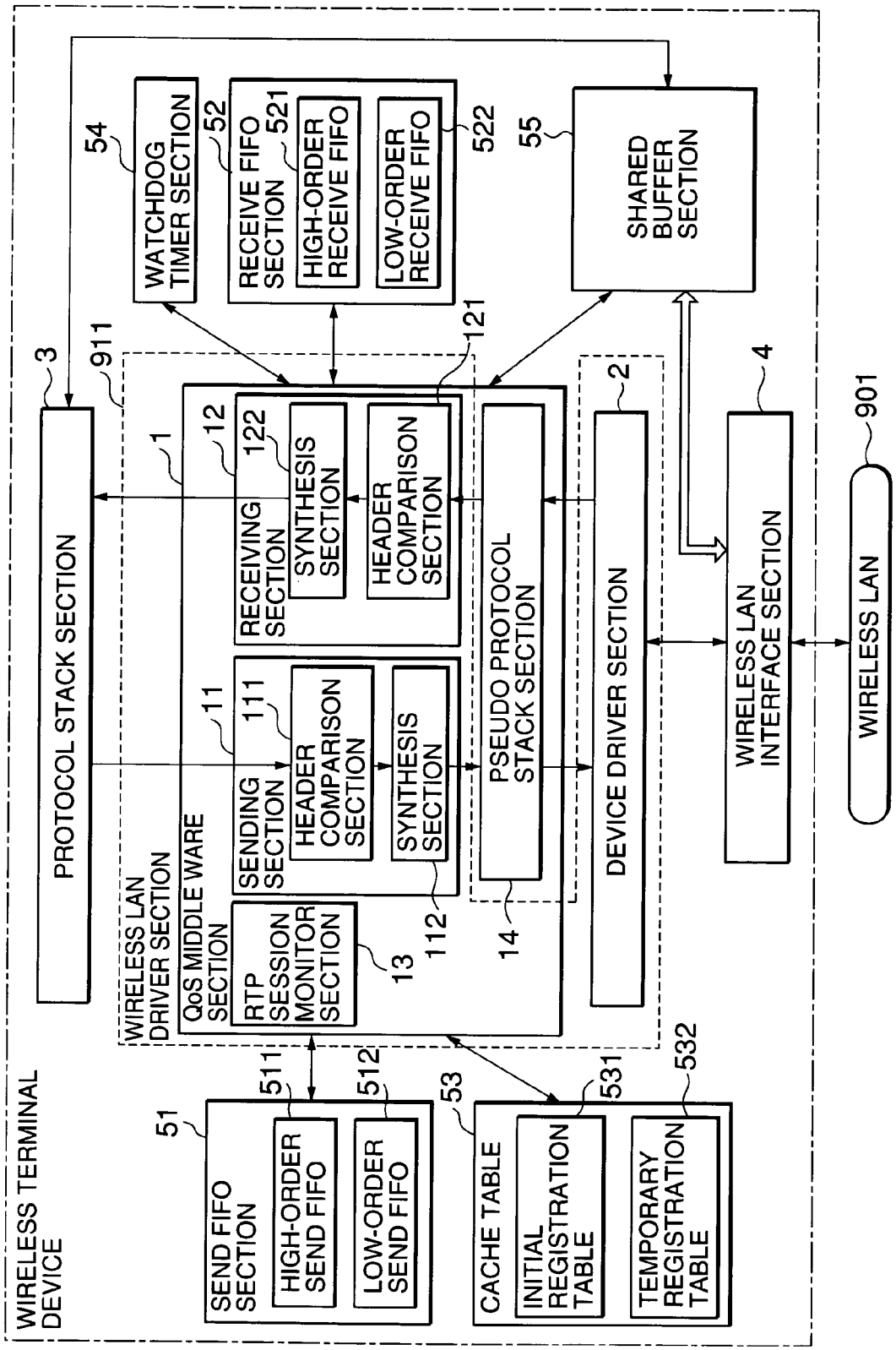
FIG. 2 is a block diagram showing a configuration of a first specific example of the present invention.

Now, description is made of a first specific example of the present invention. FIG. 2 is a block diagram showing a configuration of the first specific example of the present invention. In FIG. 2, a wireless terminal device is represented by a part surrounded by a dot-broken line. The wireless terminal device communicates with another device via a wireless LAN 901 using the Institute of Electrical and Electronic Engineers (hereinafter, referred to as "IEEE") 802.11 standard.

The wireless terminal device includes: the QoS middleware section 1; the protocol stack section 3 for controlling communication with the other device based on a communication protocol at higher than or equal to layer3 of OSI; the device driver section 2 for passing data to/from the other device by using a communication protocol at the data link layer of the wireless LAN 901; a wireless LAN interface section 4 for passing data to/from the other device by a communication protocol at the physical layer of the wireless LAN under the control of the device driver section 2; the send FIFO section 51 having multiple FIFOs; the receive FIFO section 52 having multiple FIFOs; the cache table 53; a watch dog timer section 54; and a shared buffer section 55.

The QoS middleware section 1 and the device driver section 2 operate under program control by a processor (not shown) mounted inside the wireless terminal device. Note that a wireless LAN driver section 911 including the QoS middleware section 1 and the device driver section 2 is treated as a wireless LAN driver for controlling the wireless LAN interface section 4. Also, the wireless terminal device is equipped with other function blocks and hardware that are not shown, but description thereof is omitted for convenience in explanation.

The shared buffer section 55 is allocated within a not-shown memory. Every time a frame is received from the wireless LAN 901, one buffer is allocated to the frame in the shared buffer section 55.

Each of the FIFOs of the send FIFO section 51 has an area allocated within a not-shown memory (for example, a RAM). A send request (send event) for a frame issued from the protocol stack section 3 to the device driver section 2 is queued to the send FIFO section 51 in a FIFO manner, and taken out therefrom. Further, the send FIFO section 51 has a send FIFO for each priority (storage area that is provided for each priority and used for queueing the send event). In this specific example, the send FIFO section 51 includes a high-order send FIFO 511 to which a high-priority send event is queued and a low-order send FIFO 512 to which a low-priority send event is queued.

Each of the FIFOs of the receive FIFO section 52 has an area allocated within a not-shown memory (for example, a RAM). A receive request (receive event) for a frame issued from the device driver section 2 to the protocol stack section 3 is queued in a FIFO manner, and taken out therefrom. Further, the receive FIFO section 52 has a receive FIFO for each priority (storage area that is provided for each priority and used for queueing the receive event). In this specific example, the receive FIFO section 52 includes a high-order receive FIFO 521 to which a high-priority receive event is queued and a low-order receive FIFO 522 to which a low-priority receive event is queued.

The cache table 53 includes an initial registration table 531 in which session information of an RTP frame (frame carrying an RTP packet) is previously registered and a temporary registration table 532 in which the session information is temporarily registered during session establishment. The cache table 53 is allocated within a not-shown memory (for example, a RAM). The initial registration table 531 is utilized for distinguishing a high-priority frame. The temporary registration table 532 is utilized for omitting a procedure for analyzing header information of a packet at higher than or equal to layer5 of OSI. Further, in the case where the send request (send event) is issued from the protocol stack section 3, the cache table 53 reads data in advance faster than a physical line speed, and rearranges the data, which is basically placed in a wait state according to the physical line speed, during standby (by utilizing conventional latency to send data). That is, the cache table 53 is utilized for providing prioritized communication according to the physical line speed. If the RTP packet includes the session information registered in the temporary registration table 532 or the initial registration table 531, the receive request (receive event) issued from the device driver section 2 is queued to the high-order receive FIFO 521, and if the RTP packet does not include the above-mentioned session information, the receive request is queued to the low-order receive FIFO 522. Similarly, if the RTP packet includes the session information registered in the temporary registration table 532 or the initial registration table 531, the send request (send event) issued from the protocol stack section 3 is queued to the high-order send FIFO 511, and if the RTP packet does not include the above-mentioned session information, the receive request is queued to the low-order send FIFO 512. If the send request or the receive request is queued to a high-order FIFO, the priority in a send queue or a receive queue becomes higher, respectively. Previously registered in the initial registration table 531 are multiple sets of session information each including: a MAC address of the other side corresponding to layer2 of OSI; a protocol number and an IP address of the other side corresponding to layer3 of OSI; a port number (in this case, port number of TCP or User Datagram Protocol (hereinafter, referred to as "UDP")) of the other side corresponding to layer4 of OSI; and a class of application packet at higher than or equal to layer5, which are to be compared with information within respective headers of a frame. In this case, the term "the other side" represents a source or a destination. Also, every time a new session is established, a set of session information is registered in the temporary registration table 532, the set of session information including: MAC addresses of the source and the destination corresponding to layer2 of OSI; a protocol number and IP addresses of the source and the destination corresponding to layer3 of OSI; and port numbers (in this case, port number of TCP or UDP) of the source and the destination corresponding to layer4 of OSI, which are included in respective headers of a frame. If the session is not established, the set of session information is deleted from the temporary registration table 532.

The QoS middleware section 1 includes: a sending section 11 for performing priority control (priority processing) for a send request at the time of sending a frame to the wireless LAN 901; a receiving section 12 for performing priority control (priority processing) for a send request at the time of receiving a frame from the wireless LAN 901; an RTP session monitor section 13 for monitoring session information (connection information); and a pseudo protocol stack section 14. Note that there exists a program (middleware driver) for causing the sending section 11 and the receiving section 12 of the QoS middleware section 1 to operate. This program is installed into the wireless terminal device together with a program for the device driver section 2 when the wireless LAN driver is installed into an access point.

The sending section 11 includes a header comparison section 111 and a synthesis section 112. Upon relaying a send request for a frame, the header comparison section 111 compares session information extracted from each header information within a sent frame with the session information within the cache table 53. According to a determined priority, the header comparison section 111 queues the send request (send event) to a corresponding FIFO within the send FIFO section 51. The synthesis section 112 synthesizes output data (send event) from the send FIFO section 51 (performs identification of the send FIFOs within the send FIFO section 51), and outputs the synthesized data to the pseudo protocol stack section 14.

The receiving section 12 includes a header comparison section 121 and a synthesis section 122. Upon relaying a receive request a frame from the pseudo protocol stack section 14, the header comparison section 121 compares session information extracted from each header information within a received frame with the session information within the cache table 53. According to a determined priority, the header comparison section 121 queues the receive request (receive event) to a corresponding FIFO within the receive FIFO section 52. The synthesis section 122 synthesizes output data (receive event) from the receive FIFO section 52 (performs identification of the receive FIFOs within the receive FIFO section 52), and outputs the synthesized data to the protocol stack section 3.

Figure 3:
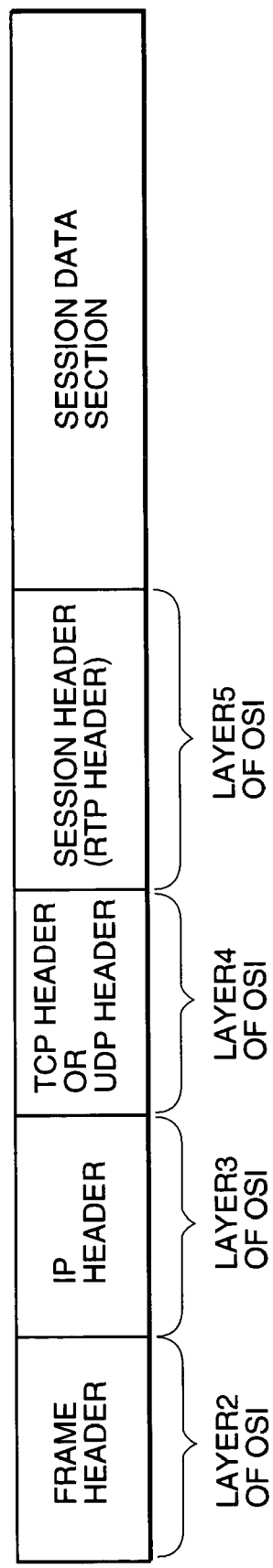
FIG. 3 is a schematic diagram showing how respective headers are allocated in a frame.

FIG. 3 is a schematic diagram showing how respective headers are allocated in a frame. The frame adopts the IEEE 802.3 standard and includes a frame header, an IP header, a TCP header (or a UDP header), a session header (RTP packet header), and a session data section.

The watchdog timer section 54 having multiple timers is utilized for monitoring the session information registered in the temporary registration table 532 of the cache table 53. Each timer within the watchdog timer section 54 is activated (cleared and started) by the RTP session monitor section 13, and issues a timer interruption when reaching a predetermined time. Note that in the case of activating the timer, a timer identification number is registered in the cache table 53 so as to correspond to the session information registered in the temporary registration table 532.

The RTP session monitor section 13 activates the timer of the watchdog timer section 54 to thereby monitor the session information registered in the temporary registration table 532 of the cache table 53. When the timer of the watchdog timer section 54 reaches the predetermined time (upon a time-out), the session information as a monitor object (session information corresponding to the timer identification number) registered in the temporary registration table 532 is deleted.

A program interface between the protocol stack section 3 and the QoS middleware section 1 is a Network Driver Interface Specification (which is a device driver interface jointly developed by 3Com Corporation and Microsoft Corporation, and hereinafter, referred to as "NDIS") interface or a socket interface. Also, an interface between the QoS middleware section 1 and the device driver section 2 is an NDIS interface or a socket interface.

In the case of issuing a receive request from the device driver section 2 to the QoS middleware section 1, the receive request is issued from the device driver section 2 through the NDIS interface (or the socket interface) as the program interface with respect to the protocol stack section 3. The pseudo protocol stack section 14 receives the receive request through the program interface, and directly issues the receive request to the receiving section 12 of QoS middleware section 1.

In the case of issuing a receive request from the receiving section 11 of the QoS middleware section 1 to the device driver section 2, the pseudo protocol stack section 14 receives the send request from the receiving section 11, and issues a send request to the device driver section 2 through the NDIS interface (or the socket interface) as the program interface with respect to the protocol stack section 3.

Next, referring to FIGS. 2 to 9, description is made of operations of the first specific example according to the present invention.

Described here is an example in which it is checked whether communication data is an RTP frame for communicating on audio using Voice over Internet Protocol (hereinafter, referred to as "VoIP") and video information of television conference, and if the communication data is the RTP frame, its processing priority in a send queue or a receive queue is raised. By raising the processing priority, RTP frames can be sent continuously to the wireless LAN 901. Generally, in order to identify an RTP frame, reception of receive data from a protocol stack at higher than or equal to layer3 of OSI such as TCP/IP starts comparison of the receive data with predetermined information for recognizing the RTP frame in a cache table. Information at layer2 to layer5 of OSI is used for the comparison. On the other hand, this specific example is characterized in that the comparison is made with the predetermined information at up to layer4 of OSI, and the procedure for analyzing a frame at higher than or equal to layer5 of OSI is omitted, thereby enhancing the processing speed. In this case, the session information of the frames carrying an RTP packet to be sent and an RTP packet to be received is previously set in the initial registration table 531 of the cache table 53. Note that the information set in the initial registration table 531 is not limited to the session information of an RTP packet, and may include a packet for RTP control information or may be information on non-RTP data communication.

First, when information (send request for an RTP packet) is received from the protocol stack section 3 at a higher level, the QoS middleware section 1 starts priority checking on a frame.

Upon receiving a send request from the protocol stack section 3, the QoS middleware section 1 passes control to the sending section 11. The header comparison section 111 of the sending section 11 checks whether session information obtained by extracting port numbers of the source and the destination, IP addresses of the source and the destination, a protocol number, and MAC addresses of the source and the destination from respective header information within the frame is registered in the temporary registration table 532 of the cache table 53 (steps S101 and S102 of FIG. 4)

Figure 4:
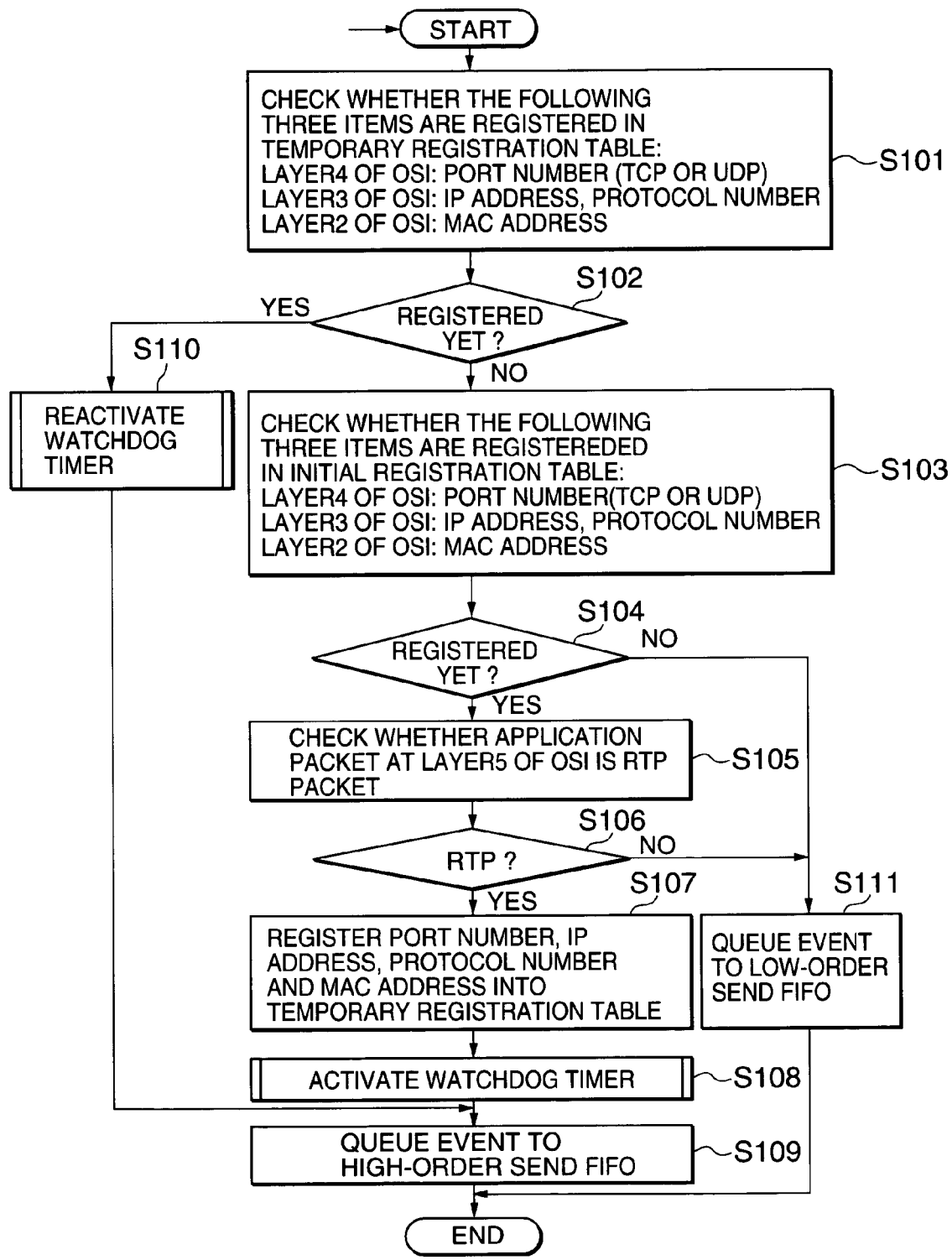
FIG. 4 is a flow chart showing an operation of a header comparison section of a sending section shown in FIG. 2.

If the session information is not registered in the temporary registration table 532 (note that the session information of the RTP frame that is sent or received at the start is not registered therein) in step S102, the header comparison section 111 of the sending section 11 checks whether session information obtained by extracting a port number of the source or the destination, an IP addresses of the source or the destination, a protocol number, and a MAC addresses of the source or the destination from the respective header information within the frame is registered in the initial registration table 531 of the cache table 53 (steps S103 and S104 of FIG. 4).

If the session information is registered in the initial registration table 531 in step S104, the process advances to step S105. The header comparison section 111 of the sending section 11 checks whether a header information of a frame to be sent corresponding to a header area of the RTP packet at layer5 of OSI is included in predetermined information (a pattern representing an RTP packet is previously registered in a class field for an application packet in cache table 53) to thereby check whether the frame to be sent carries the RTP packet (steps S105 and S106).

In the case of recognizing the RTP packet from its header information in step S106, the header comparison section 111 of the sending section 11 registers the port numbers of the source and the destination, the IP addresses of the source and the destination, the protocol number, and the MAC addresses of the source and the destination, which are extracted from respective header information within the frame to be sent, as a set of session information in the temporary registration table 532 (step S107). At the same time, the header comparison section 111 causes the RTP session monitor section 13 to activate (reset and start) the timer of the watchdog timer section 54 (step S108).

Figure 8:
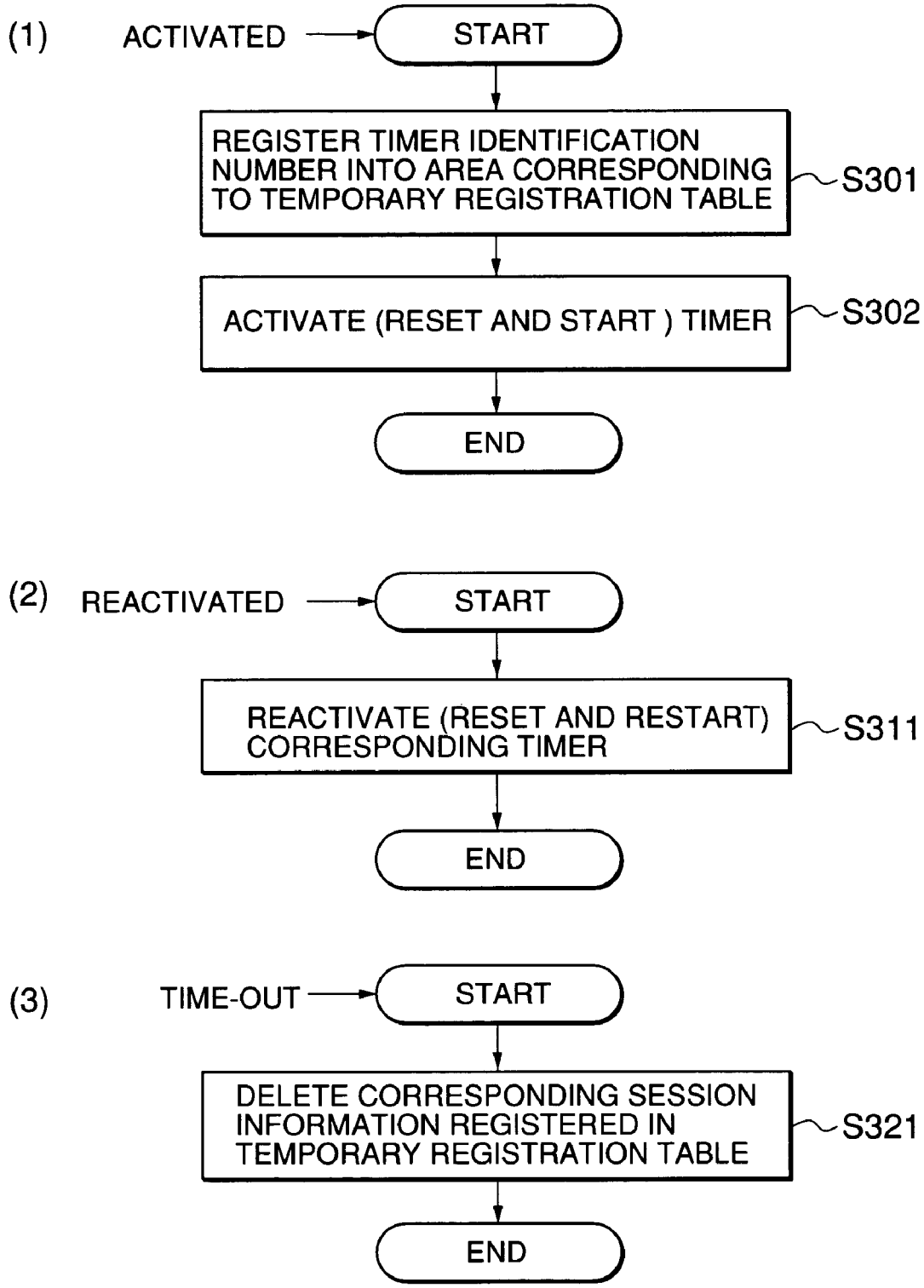
FIGS. 8(1) to 8(3) are flow charts showing operations of an RTP session monitor section shown in FIG. 2 or 10.

The RTP session monitor section 13 in this case registers the timer identification number for the timer of the watchdog timer section 54 to be activated into an area corresponding to the session information registered within the temporary registration table 532 in step S107, and activates the timer of the watchdog timer section 54 (steps S301 and S302 of FIG. 8(1)).

After activating the timer of watchdog timer section 54, the header comparison section 111 of the sending section 11 directs the send request toward the high-order send FIFO 511 as a send event, and queues the send request to the high-order send FIFO 511 (step S109 of FIG. 4). Note that the send event includes identification information of a send request, a storage area within a shared buffer section 55, and length information of a frame to be relayed.

Note that if the header information within the frame to be sent does not corresponds to the header area of the RTP packet in step S106, the header comparison section 111 of the sending section 11 directs the send request toward the low-order send FIFO 512 as the send event, and queues the send request to the low-order send FIFO 512 (step S111).

Note that if the session information is not registered in the initial registration table 531 in step S104, the header comparison section 111 of the sending section 11 directs the send request toward the low-order send FIFO 512 as the send event, and queues the send request to the low-order send FIFO 512 (step S111).

Figure 5:
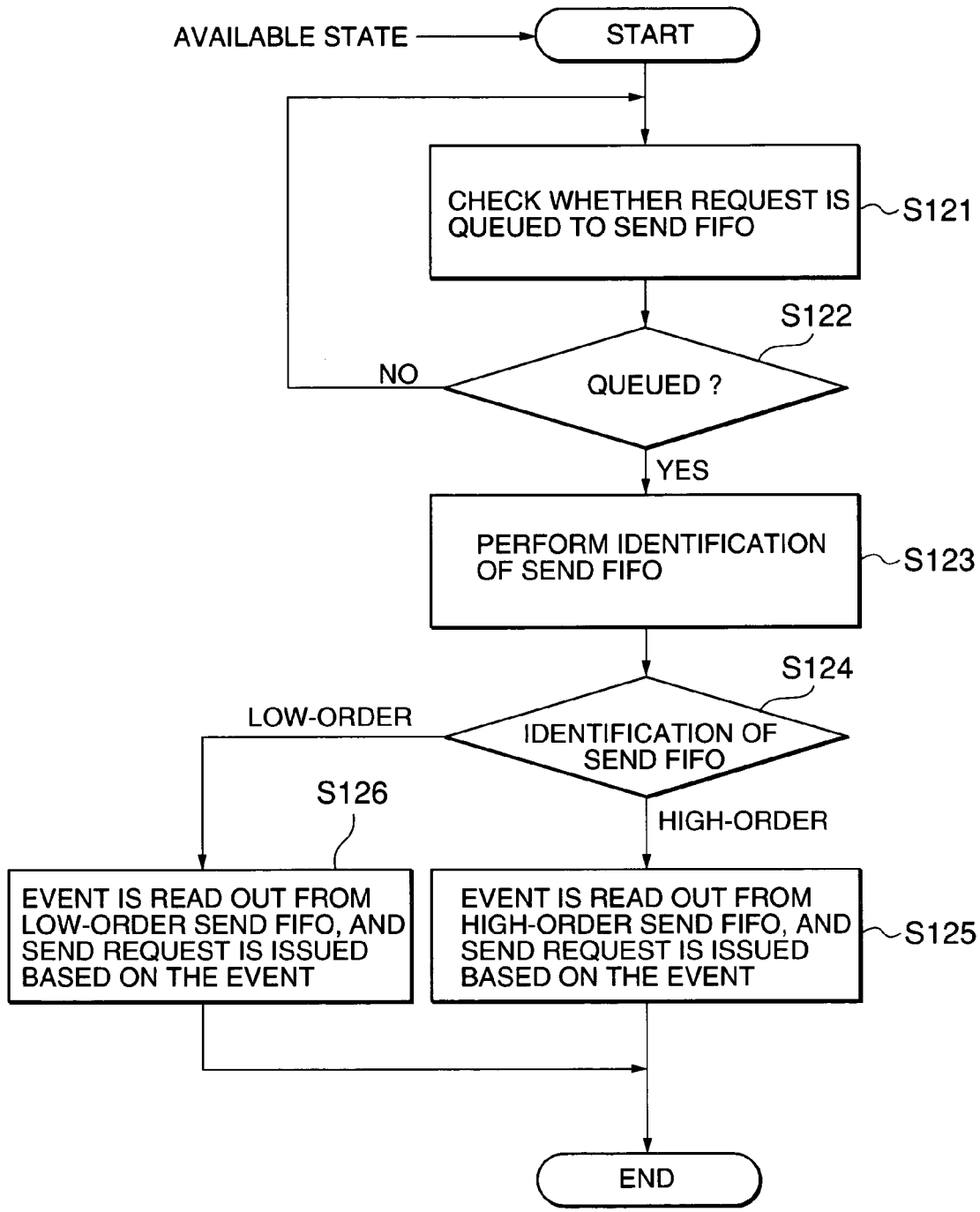
FIG. 5 is a flow chart showing an operation of a synthesis section of the sending section shown in FIG. 2.

On the other hand, unless sending processing is underway in the device driver section 2 (if the device driver section 2 is available), the synthesis section 112 of the sending section 11 checks whether the send request is queued to the send FIFO section 51, and if the send request is queued, identification of the send FIFO is performed (steps S121 to S124 of FIG. 5). The availability of the device driver section 2 is described above as "unless sending processing is underway", but the synthesis section 112 of the sending section 11 may be operated depending on a remaining amount of data to be sent. That is, if the synthesis section 112 of the sending section 11 is operated depending on the remaining amount of data to be sent, send requests in a send queue can be rearranged according to their priorities by utilizing the latency to send during standby.

If the send request is queued to the high-order send FIFO 511 in step S124, the synthesis section 112 of the sending section 11 unconditionally issues a send request to the pseudo protocol stack section 14 based on the send event read out from the high-order send FIFO 511 (step S125). If the send request is not queued to the high-order send FIFO 511 in step S124, a send request is issued to the pseudo protocol stack section 14 based on the send event read out from the low-order send FIFO 512 (step S126).

The pseudo protocol stack section 14 that has received the send request issues a send request to the device driver section 2 through the NDIS interface (or the socket interface) based on the send event.

The device driver section 2 that has received the send request from the synthesis section 112 of the sending section 11 causes the wireless LAN interface section 4 to send the frame from the corresponding buffer of the shared buffer section 55 to the wireless LAN 901 based on the send request.

After the first RTP packet is sent as described above, in order to send consecutive RTP packets to the same device, the protocol stack section 3 issues a send request for a subsequent RTP packet to the QoS middleware section 1.

If the session information is registered in the temporary registration table 532, the header comparison section 111 causes the RTP session monitor section 13 to reactivate (reset and restart) the timer of the watchdog timer section 54

(step S110). At the same time, the header comparison section 111 directs the send request toward the high-order send FIFO 511, and queues the send request to the high-order send FIFO 511 (step S109).

The RTP session monitor section 13 in this case extracts the timer identification number for the timer of the watchdog timer section 54 to be activated from the temporary registration table 532, and reactivates (reset and restart) the timer (timer having the extracted timer identification number) of the watchdog timer section 54 (step S311 of FIG. 8(2)).

On the other hand, unless sending processing is underway in the device driver section 2 (if the device driver section 2 is available), the synthesis section 112 of the sending section 11 checks whether the send request is queued to the send FIFO section 51, and if the send request is queued, the identification of the send FIFO is performed (steps S121 to S124 of FIG. 5).

In step S124, the send request is queued to the high-order send FIFO 511, so that the synthesis section 112 of the sending section 11 unconditionally issues a send request to the pseudo protocol stack section 14 based on the send event read out from the high-order send FIFO 511 (step S125).

The device driver section 2 that has received the send request from the pseudo protocol stack section 14 causes the wireless LAN interface section 4 to send the frame from the corresponding buffer of the shared buffer section 55 to the wireless LAN 901 based on the send request.

If a predetermined time has passed without sending the consecutive RTP packets to the same device, the corresponding timer of the watchdog timer section 54 causes a time-out. Then, the RTP session monitor section 13 deletes the session information (session information corresponding to the timer identification number for the timer causing a time-out) registered in the temporary registration table 532 (step S321 of FIG. 8(3)).

As described above, in the case of sending the consecutive RTP packets to the same device, the session information is already registered in the temporary registration table 532 of the cache table 53. Accordingly, it is only necessary to check whether there is corresponding registration in the temporary registration table 532 based on the session information extracted from respective header information at layer2 to layer4 of OSI. That is, it is unnecessary to perform checking on the header information of the RTP packet, which is complicated processing. Further, the send event is queued to the high-priority queue (high-order send FIFO 511), and a send request is issued from the queue with a higher priority, thereby enabling the high-speed processing.

If the wireless LAN interface section 4 receives a frame carrying an RTP packet from the wireless LAN 901, the device driver section 2 causes the wireless LAN interface section 4 to store the received frame into the shared buffer section 55. After the frame is stored, the device driver section 2 issues a receive request for the frame to the QoS middleware section 1 through the NDIS interface (or the socket interface).

If the QoS middleware section 1 that has received the receive request from the device driver section 2 passes control to the pseudo protocol stack section 14, the pseudo protocol stack section 14 issues a receive request to the receiving section 12 (step S411 of FIG. 9).

Figure 6:
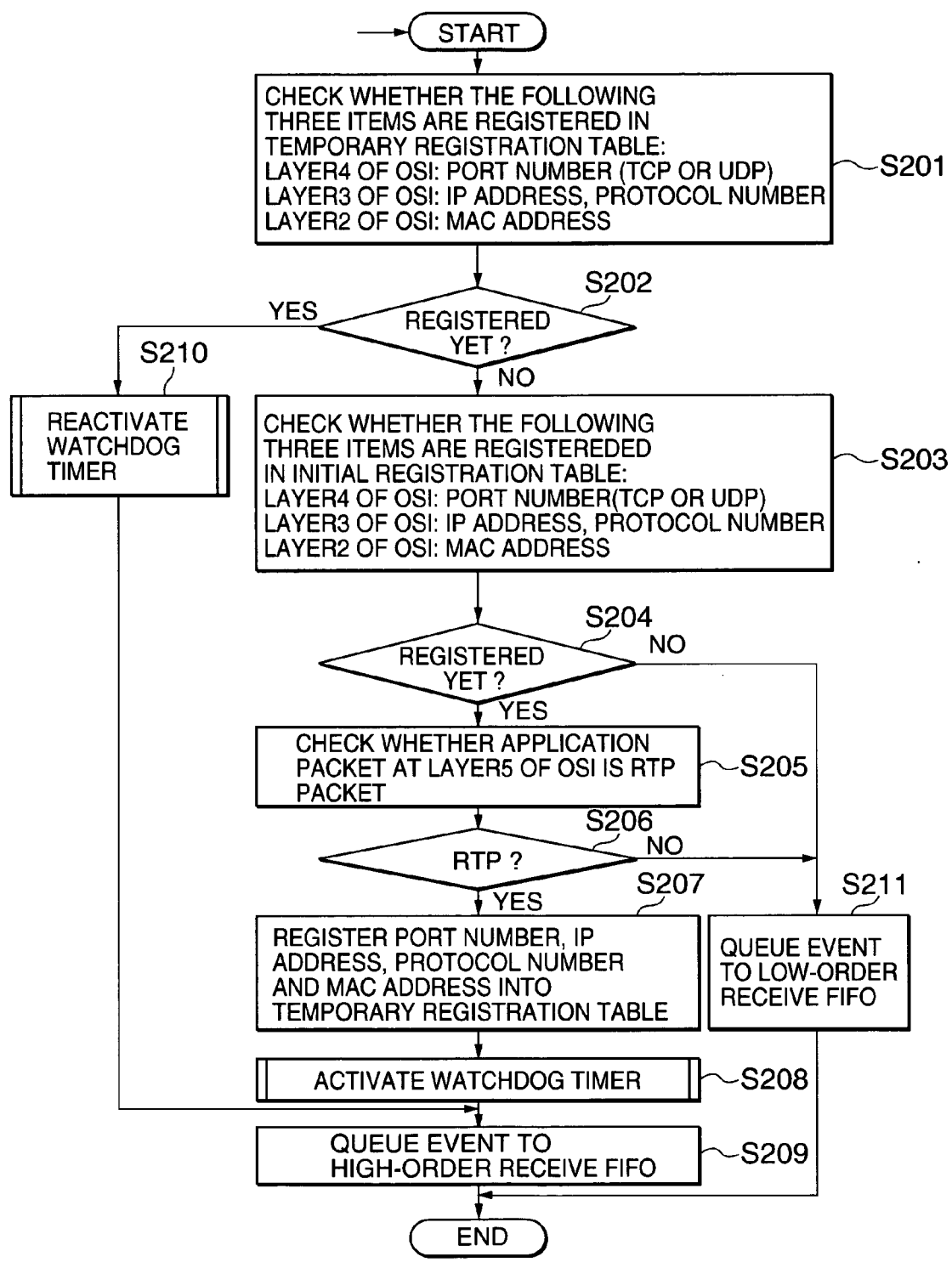
FIG. 6 is a flow chart showing an operation of a header comparison section of a receiving section shown in FIG. 2.

The header comparison section 121 of the receiving section 12 checks whether session information obtained by extracting port numbers of the source and the destination, IP addresses of the source and the destination, a protocol number, and MAC addresses of the source and the destination from respective header information within the frame is registered in the temporary registration table 532 of the cache table 53 (steps S201 and S202 of FIG. 6).

If the session information is not registered in the temporary registration table 532 (note that the session information of the RTP frame that is sent or received at the start is not registered therein) in step S202, the header comparison section 121 of the receiving section 12 checks whether session information obtained by extracting a port number of the source or the destination, an IP addresses of the source or the destination, a protocol number, and a MAC addresses of the source or the destination from the respective header information within the frame is registered in the initial registration table 531 of the cache table 53 (steps S203 and S204 of FIG. 6).

If the header information is registered in the initial registration table 531 in step S204, the process advances to step S205. The header comparison section 121 of the receiving section 12 checks whether a header information of a frame to be received corresponding to a header area of the RTP packet at layer5 of OSI is included in predetermined information to thereby check whether the frame to be received carries the RTP packet (steps S205 and S206).

In the case of recognizing the RTP packet from its header information in step S206, the header comparison section 121 of the receiving section 12 registers the port numbers of the source and the destination, the IP addresses of the source and the destination, the protocol number, and the MAC addresses of the source and the destination, which are extracted from respective header information within the frame to be received, as a set of session information in the temporary registration table 532 (step S207). At the same time, the header comparison section 121 causes the RTP session monitor section 13 to activate (reset and start) the timer of the watchdog timer section 54 (step S208).

The RTP session monitor section 13 in this case registers the timer identification number for the timer of the watchdog timer section 54 to be activated into an area corresponding to the session information registered within the temporary registration table 532 in step S207, and activates the timer of the watchdog timer section 54 (steps S301 and S302 of FIG. 8(1)).

After activating the timer of watchdog timer section 54, the header comparison section 121 of the receiving section 12 directs the send request toward the high-order receive FIFO 521 as a send event, and queues the send request to the high-order receive FIFO 521 (step S209 of FIG. 6). Note that the receive event includes identification information of a receive request, a storage area within a shared buffer section 55, and length information of a frame to be received.

Note that if the header information within the frame to be received does not corresponds to the header area of the RTP packet in step S206, the header comparison section 121 of the receiving section 12 directs the send request toward the low-order receive FIFO 522 as the send event, and queues the send request to the low-order receive FIFO 522 (step S211).

Note that if the session information is not registered in the initial registration table 531 in step S204, the header comparison section 121 of the receiving section 12 directs the receive request toward the low-order receive FIFO 522 as the receive event, and queues the receive request to the low-order receive FIFO 522 (step S211).

Figure 7:
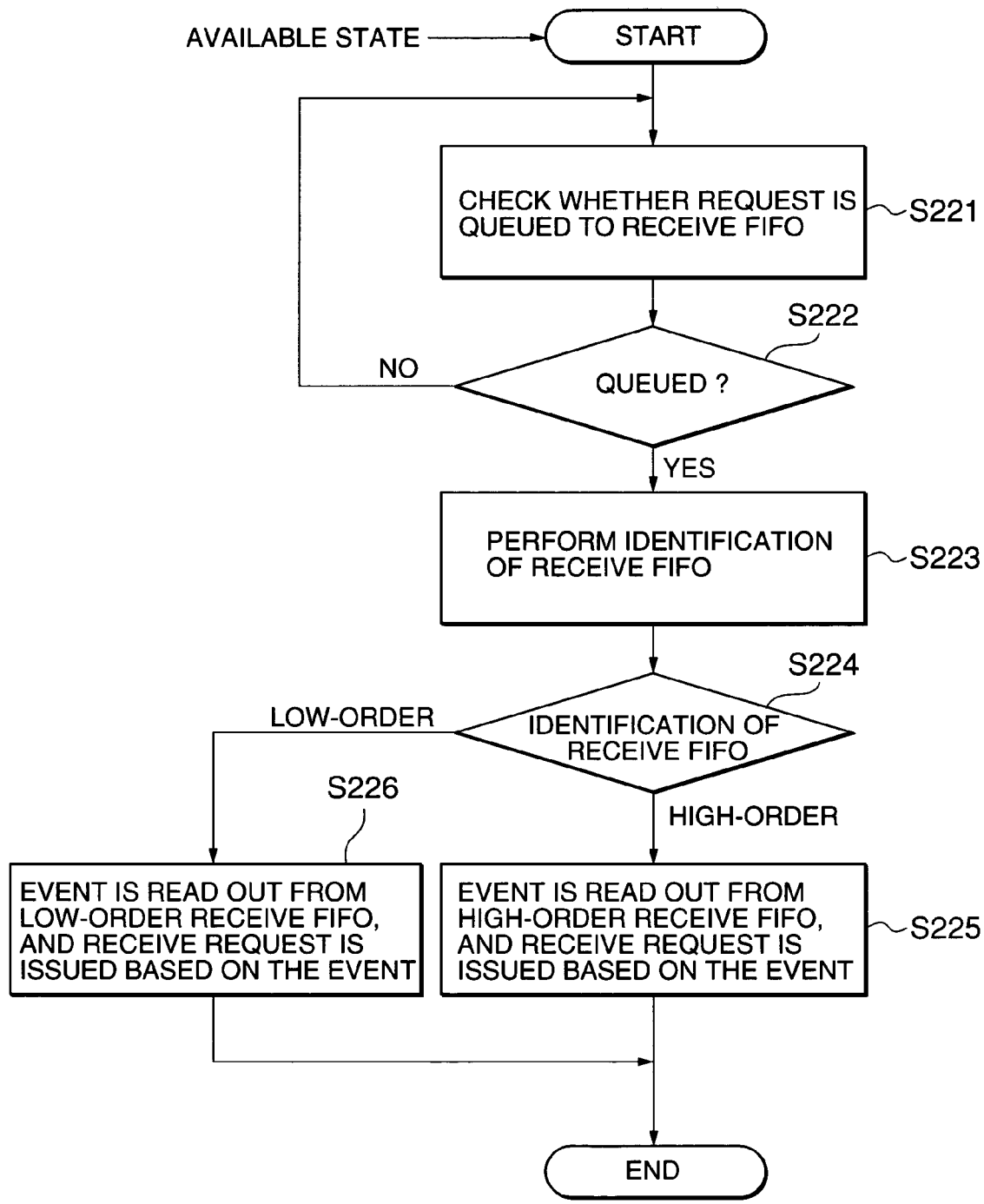
FIG. 7 is a flow chart showing an operation of a synthesis section of the receiving section shown in FIG. 2.

On the other hand, unless receiving processing is underway in the protocol stack section 3 (if the protocol stack section 3 is available), the synthesis section 122 of the receiving section 12 checks whether the receive request is queued to the receive FIFO section 52, and if the receive request is queued, identification of the receive FIFO is performed (steps S221 to S224 of FIG. 7).

If the receive request is queued to the high-order receive FIFO 521 in step S224, the synthesis section 122 of the receiving section 12 unconditionally issues a receive request to the protocol stack section 3 based on the receive event read out from the high-order receive FIFO 521 (step S225). If the receive request is not queued to the high-order receive FIFO 521 in step S224, a receive request is issued to the protocol stack section 3 according to the NDIS interface (or socket interface) based on the receive event read out from the low-order receive FIFO 522 (step S226).

The protocol stack section 3 that has received the receive request performs control using a communication protocol at higher than or equal to layer3 of OSI based on the receive request.

After the first RTP packet is received as described above, in order to receive the consecutive RTP packets from the same device, the device driver section 2 issues a receive request for a subsequent RTP packet to the QoS middleware section 1.

If the session information is registered in the temporary registration table 532 in step S202, the header comparison section 121 causes the RTP session monitor section 13 to reactivate (reset and restart) the timer of the watchdog timer section 54 (step S210) At the same time, the header comparison section 121 directs the receive request toward the high-order receive FIFO 521, and queues the receive request to the high-order receive FIFO 521 (step S209)

The RTP session monitor section 13 in this case extracts the timer identification number for the timer of the watchdog timer section 54 to be activated from the temporary registration table 532, and reactivates (reset and restart) the timer (timer having the extracted timer identification number) of the watchdog timer section 54 (step S311 of FIG. 8(2)).

On the other hand, unless receiving processing is underway in the protocol stack section 3 (if the protocol stack section 3 is available), the synthesis section 122 of the receiving section 12 checks whether the receive request is queued to the receive FIFO section 52, and if the receive request is queued, identification of the receive FIFO is performed (steps S221 to S224 of FIG. 7).

As the receive request is queued to the high-order receive FIFO 521 in step S224, the synthesis section 122 of the receiving section 12 unconditionally issues a receive request to the protocol stack section 3 based on the receive event read out from the high-order receive FIFO 521 (step S225).

The protocol stack section 3 that has received the receive request from the synthesis section 122 of the receiving section 12 performs control using a communication protocol at higher than or equal to layer3 of OSI based on the receive request.

If a predetermined time has passed without receiving the consecutive RTP packets from the same device, the corresponding timer of the watchdog timer section 54 causes a time-out. Then, the RTP session monitor section 13 deletes the session information (session information corresponding to the timer identification number for the timer causing a time-out) registered in the temporary registration table 532 (step S321 of FIG. 8(3)).

Note that in the above-mentioned specific example, description is made relating to only an RTP packet, but the same operations also apply to a specific packet, other than the RTP packet, having a communication protocol at higher than or equal to layer5 of OSI. The case of such a specific packet is naturally included in the present invention.

Also, in the above description, the RTP session monitor section 13 assigns one timer of the watchdog timer section 54 to each session for use, but may use one timer to monitor the time for all sessions. In this case, for example, the timer is set to interrupt into the RTP session monitor section 13 at constant intervals (for example, 1 ms). Every time session information is registered into the temporary registration table 532 of the cache table 53, the RTP session monitor section 13 ensures an area (count area) where the time is counted in step S108 (or step S208 in the case of receiving). If a timer interruption occurs, the registered count area is counted up by +1, and cleared in step S110 (or step S210 in the case of receiving). If the count area reaches a predetermined value upon a timer interruption, the RTP session monitor section 13 deletes the corresponding session information.

As described above, according to this specific example, in the case of receiving the consecutive RTP packets from the same device, the session information is already registered in the temporary registration table 532 of the cache table 53. Accordingly, it is only necessary to check whether there is corresponding registration in the temporary registration table 532 based on the session information extracted from respective header information at layer2 to layer4 of OSI. That is, it is unnecessary to perform checking on the header information of the RTP packet, which is complicated processing. Further, the receive event is queued to the high-priority queue (high-order receive FIFO 521), and a receive request is issued from the queue with a higher priority, thereby enabling the high-speed processing.

According to this specific example, the QoS middleware section 1 for performing priority processing using FIFOs is provided between the device driver section 2 and the protocol stack section 3 that operates based on a high-level communication protocol. Accordingly, it is possible to reduce phenomena in which high-priority communication data waits to be sent to the wireless LAN 901 and in which high-priority communication data waits to be sent to the protocol stack section 3.

According to this specific example, if the session information of the first RTP packet is registered into the temporary registration table 532 of the cache table 53, the registered session information is regarded as the one for an RTP stream (consecutive RTP frames) until the session information is not used any more. Accordingly, it is possible to put a high priority on receiving processing in a protocol stack and/or sending processing in a device driver with respect to a specific packet assigned a high priority with as small delay as possible.

According to this specific example, the QoS middleware section 1 for the high-speed processing, which is interposed between the protocol stack section 3 and the device driver section 2, includes the pseudo protocol stack section 14. Accordingly, without replacing an interface between the protocol stack section 3 and the device driver section 2 with a special interface, the high-speed processing is possible with a conventional interface.

According to this specific example, the respective FIFOs of the send FIFO section 51 and the receive FIFO section 52 may be allocated within a memory (for example, RAM) provided to a wireless terminal device as standard equipment, and the program for the QoS middleware section 1 may be installed into the wireless terminal device. By such arrangement, QoS can be provided while the current system environment is utilized as it is. At the same time, there can be obtained a cost-effectiveness, which makes it unnecessary to newly purchase QoS-capable hardware adapted in view of the wait states.

Figure 10:
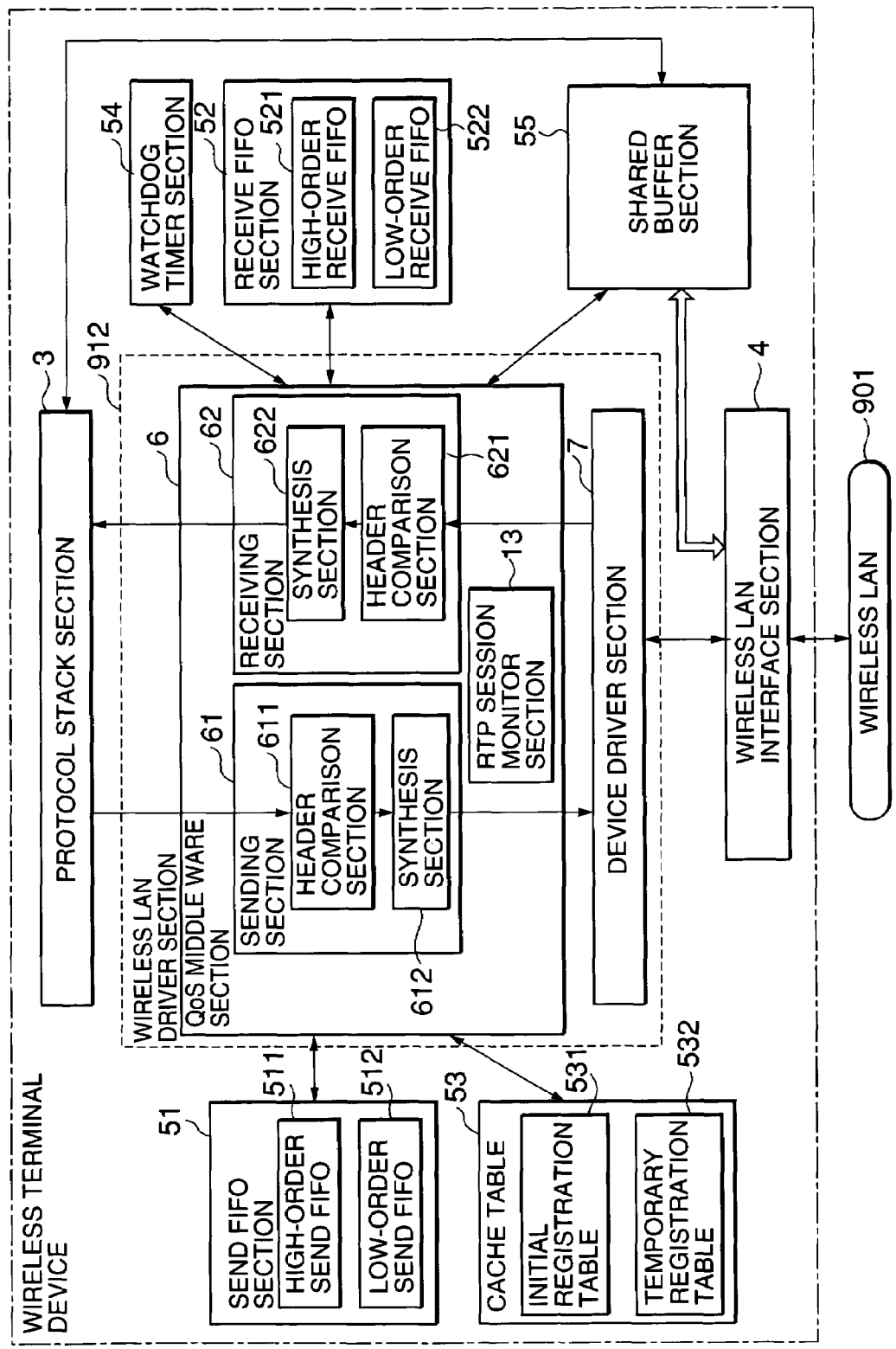
FIG. 10 is a block diagram showing a configuration of a second specific example of the present invention.

Next, description is made of a second specific example of the present invention. FIG. 10 is a block diagram showing a configuration of the second specific example of the present invention.

In FIG. 10, a wireless terminal device is represented by a part surrounded by a dot-broken line. The wireless terminal device communicates with another device via a wireless LAN 901 using the IEEE 802.11 standard. The wireless terminal device includes: the QoS middleware section 6; the protocol stack section 3 for controlling communication with the other device based on a communication protocol at higher than or equal to layer3 of OSI; the device driver section 7 for passing data to/from the other device by using a communication protocol at the data link layer of the wireless LAN 901; a wireless LAN interface section 4 for passing data to/from the other device by a communication protocol at the physical layer of the wireless LAN under the control of the device driver section 7; the send FIFO section 51 having multiple FIFOs; the receive FIFO section 52 having multiple FIFOs; the cache table 53; a watchdog timer section 54; and a shared buffer section 55. In this case, the QoS middleware section 6 and the device driver section 7 operate under program control by a processor (not shown) mounted inside the wireless terminal device. Note that a wireless LAN driver section 912 including the QoS middleware section 6 and the device driver section 7 is treated as a wireless LAN driver 912 for controlling the wireless LAN interface section 4. Also, the wireless terminal device is equipped with other function blocks and hardware that are not shown, but description thereof is omitted for convenience in explanation.

The second specific example is different from the first specific example in that the pseudo protocol stack section (denoted by reference numeral 14 in FIG. 2) is eliminated. That is, without using the NDIS interface nor the socket interface, sending and reception are directly made between the device driver section 7 and the QoS middleware section 6, thereby enabling the higher-speed processing. Note that as the interface between the protocol stack section 3 and the QoS middleware section 6, a standard interface such as the NDIS interface or the socket interface is used in order to maintain compatibility with the conventional environment.

The QoS middleware section 6 includes: a sending section 61 for performing priority control (priority processing) for a send request at the time of sending a frame to the wireless LAN 901; a receiving section 62 for performing priority control (priority processing) for a receive request at the time of receiving a frame from the wireless LAN 901; and an RTP session monitor section 13 for monitoring session information (connection information).

The sending section 61 includes a header comparison section 611 and a synthesis section 612. Upon relaying a send request for a frame, the header comparison section 611 compares session information extracted from each header information within a sent frame with the session information within the cache table 53. According to a determined priority, the header comparison section 611 queues the send request (send event) to a corresponding FIFO within the send FIFO section 51. The synthesis section 612 synthesizes output data (send event) from the send FIFO section 51 (performs identification of the send FIFOs within the send FIFO section 51), and outputs the synthesized data to the device driver section 7.

The receiving section 62 includes a header comparison section 621 and a synthesis section 622. Upon relaying a receive request for a frame, the header comparison section 621 compares session information extracted from each header information within a received frame with the session information within the cache table 53. According to a determined priority, the header comparison section 621 queues the receive request (receive event) to a corresponding FIFO within the receive FIFO section 52. The synthesis section 622 synthesizes output data (receive event) from the receive FIFO section 52 (performs identification of the receive FIFOs within the receive FIFO section 52), and outputs the synthesized data to the protocol stack section 3.

Note that the other configuration is the same as that of the first specific example, and therefore its description is omitted. In FIG. 10, the blocks exhibiting the same functions as those of the first specific example are denoted by the same reference numerals as those for the blocks of FIG. 2.

Next, referring to FIGS. 3, 8, and 10 to 14, description is made of operations of the second specific example according to the present invention.

Described here is an example in which it is checked whether communication data is an RTP frame for communicating on audio using VoIP and video information of television conference, and if the communication data is the RTP frame, its processing priority is raised. By raising the processing priority, RTP frames can be sent continuously to the wireless LAN 901. Generally, in order to identify an RTP frame, reception of receive data from a protocol stack at higher than or equal to layer3 of OSI such as TCP/IP starts comparison of the receive data with predetermined information for recognizing the RTP frame in a cache table. On the other hand, this specific example is characterized in that the comparison is made with the predetermined information at up to layer4 of OSI, and the procedure for analyzing a frame at higher than or equal to layer5 of OSI is omitted, thereby enhancing the processing speed. In this case, the session information of the frames carrying an RTP packet to be sent and an RTP packet to be received is previously set in the initial registration table 531 of the cache table 53. Note that the information set in the initial registration table 531 is not limited to the session information of an RTP packet, and may include a packet for RTP control information or may be information on non-RTP data communication.

First, when information (send request for an RTP packet) is received from the protocol stack section 3 at a higher level, the QoS middleware section 6 starts priority checking on a frame.

Upon receiving a send request from the protocol stack section 3, the QoS middleware section 6 passes control to the sending section 61. The header comparison section 611 of the sending section 61 checks whether session information obtained by extracting port numbers of the source and the destination, IP addresses of the source and the destination, a protocol number, and MAC addresses of the source and the destination from respective header information within the frame is registered in the temporary registration table 532 of the cache table 53 (steps S501 and S502 of FIG. 11).

Figure 11:
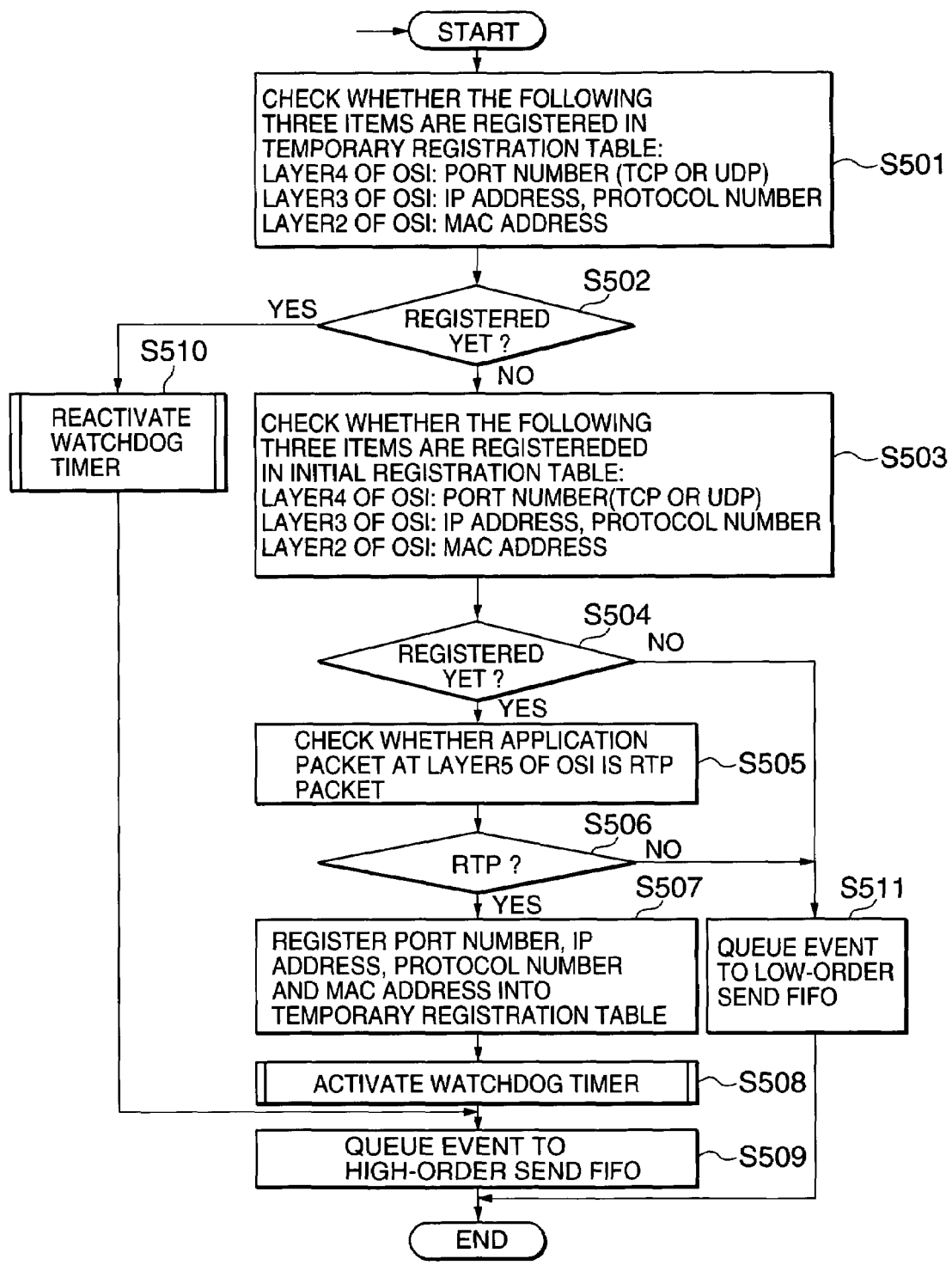
FIG. 11 is a flow chart showing an operation of a header comparison section of a sending section shown in FIG. 10.

If the session information is not registered in the temporary registration table 532 (note that the session information of the RTP frame that is sent or received at the start is not registered therein) in step S502, the header comparison section 611 of the sending section 61 checks whether session information obtained by extracting a port number of the source or the destination, an IP addresses of the source or the destination, a protocol number, and a MAC addresses of the source or the destination from the respective header information within the frame is registered in the initial registration table 531 of the cache table 53 (steps S503 and S504 of FIG. 11).

If the session information is registered in the initial registration table 531 in step S504, the process advances to step S505. The header comparison section 611 of the sending section 61 checks whether a header information of a frame to be sent corresponding to a header area of the RTP packet at layer5 of OSI is included in predetermined information to thereby check whether the frame to be sent carries the RTP packet (steps S505 and S506).

In the case of recognizing the RTP packet from its header information in step S506, the header comparison section 611 of the sending section 61 registers the port numbers of the source and the destination, the IP addresses of the source and the destination, the protocol number, and the MAC addresses of the source and the destination, which are extracted from respective header information within the frame to be sent, as a set of session information in the temporary registration table 532 (step S507). At the same time, the header comparison section 611 causes the RTP session monitor section 13 to activate (reset and start) the timer of the watchdog timer section 54 (step S508).

The RTP session monitor section 13 in this case registers the timer identification number for the timer of the watchdog timer section 54 to be activated into an area corresponding to the session information registered within the temporary registration table 532 in step S507, and activates the timer of the watchdog timer section 54 (steps S301 and S302 of FIG. 8(1)).

After activating the timer of watchdog timer section 54, the header comparison section 611 of the sending section 61 directs the send request toward the high-order send FIFO 511 as a send event, and queues the send request to the high-order send FIFO 511 (step S509 of FIG. 11). Note that the send event includes identification information of a send request, a storage area within a shared buffer section 55, and length information of a frame to be relayed.

Note that if the header information within the frame to be sent does not corresponds to the header area of the RTP packet in step S506, the header comparison section 611 of the sending section 61 directs the send request toward the low-order send FIFO 512 as the send event, and queues the send request to the low-order send FIFO 512 (step S511).

Note that if the session information is not registered in the initial registration table 531 in step S504, the header comparison section 611 of the sending section 61 directs the send request toward the low-order send FIFO 512 as the send event, and queues the send request to the low-order send FIFO 512 (step S511).

Figure 12:
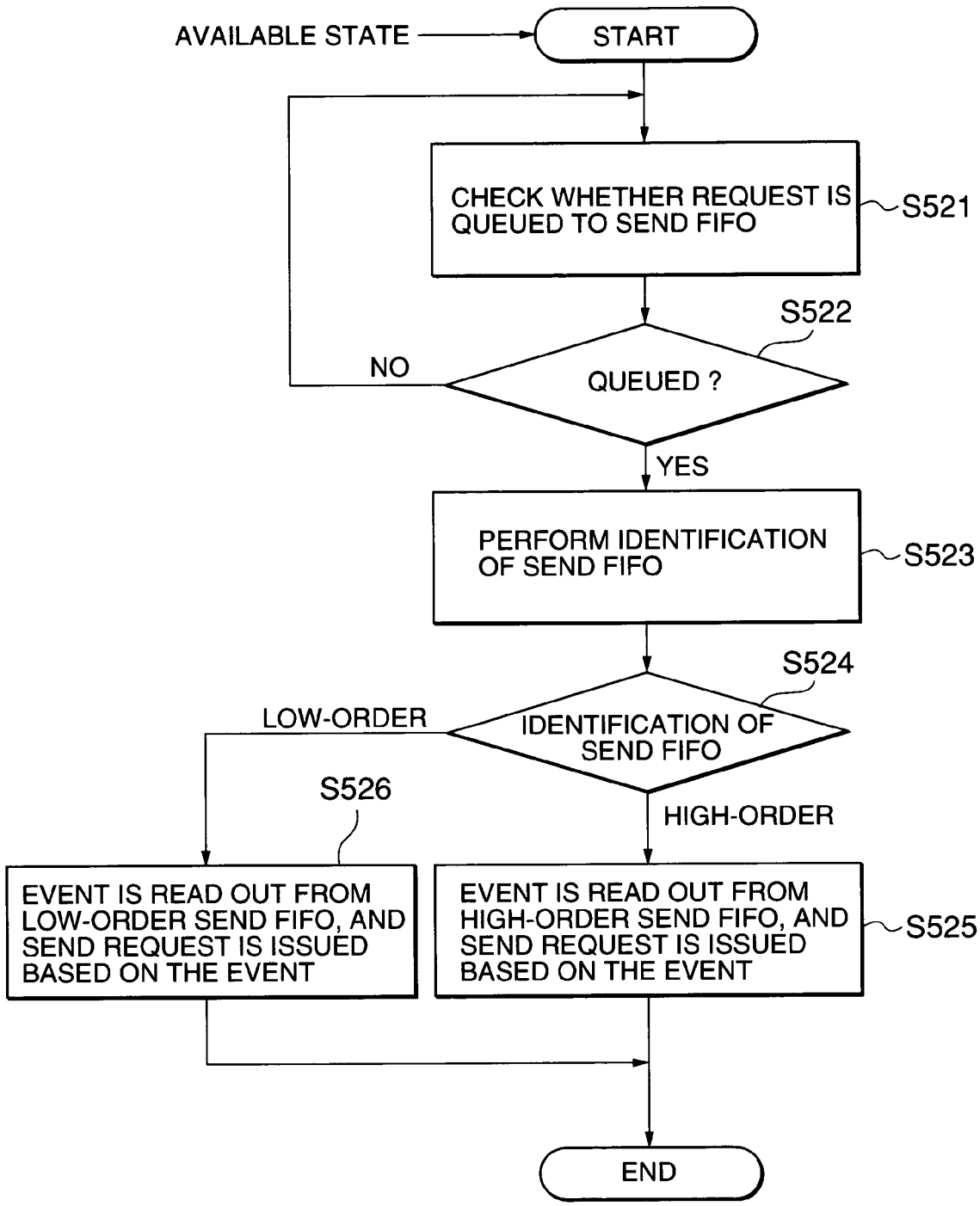
FIG. 12 is a flow chart showing an operation of a synthesis section of the sending section shown in FIG. 10.

On the other hand, unless sending processing is underway in the wireless LAN device driver section 41 (if the device driver section 41 is available), the synthesis section 612 of the sending section 61 checks whether the send request is queued to the send FIFO section 51, and if the send request is queued, identification of the send FIFO is performed (steps S521 to S524 of FIG. 12).

If the send request is queued to the high-order send FIFO 511 in step S524, the synthesis section 612 of the sending section 61 unconditionally issues a send request to the device driver section 7 based on the send event read out from the high-order send FIFO 511 (step S525). If the send request is not queued to the high-order send FIFO 511 in step S524, a send request is issued to the device driver section 7 based on the send event read out from the low-order send FIFO 512 (step S526).

The device driver section 7 that has received the send request from the QoS middleware section 6 causes the wireless LAN interface section 4 to send the frame from the corresponding buffer of the shared buffer section 55 to the wireless LAN 901 based on the send request.

After the first RTP packet is sent as described above, in order to send the consecutive RTP packets to the same device, the protocol stack section 3 issues a send request for a subsequent RTP packet to the QoS middleware section 6.

If the session information is registered in the temporary registration table 532 in step S502, the header comparison section 611 causes the RTP session monitor section 13 to reactivate (reset and restart) the timer of the watchdog timer section 54 (step S510). At the same time, the header comparison section 611 directs the send request toward the high-order send FIFO 511, and queues the send request to the high-order send FIFO 511 (step S509).

The RTP session monitor section 13 in this case extracts the timer identification number for the timer of the watchdog timer section 54 to be activated from the temporary registration table 532, and reactivates (reset and restart) the timer (timer having the extracted timer identification number) of the watchdog timer section 54 (step S311 of FIG. 8(2)).

On the other hand, unless sending processing is underway in the wireless LAN device driver section 41 (if the wireless LAN device driver section 41 is available), the synthesis section 612 of the sending section 61 checks whether the send request is queued to the send FIFO section 51, and if the send request is queued, the identification of the send FIFO is performed (steps S521 to S524 of FIG. 12).

In step S524, the send request is queued to the high-order send FIFO 511, so that the synthesis section 612 of the sending section 61 unconditionally issues a send request to the device driver section 7 based on the send event read out from the high-order send FIFO 511 (step S525).

The device driver section 7 that has received the send request from the QoS middleware section 6 causes the wireless LAN interface section 4 to send the frame from the corresponding buffer of the shared buffer section 55 to the wireless LAN 901 based on the send request.

If a predetermined time has passed without sending the consecutive RTP packets to the same device, the corresponding timer of the watchdog timer section 54 causes a time-out. Then, the RTP session monitor section 13 deletes the session information (session information corresponding to the timer identification number for the timer causing a time-out) registered in the temporary registration table 532 (step S321 of FIG. 8(3)).

Note that in the second specific example, description is made relating to only an RTP packet, but the same operations also apply to a specific packet, other than the RTP packet, having a communication protocol at higher than or equal to layer5 of OSI. The case of such a specific packet is naturally included in the present invention.

As described above, in the case of sending the consecutive RTP packets to the same device, the session information is already registered in the temporary registration table 532 of the cache table 53. Accordingly, it is only necessary to check whether there is corresponding registration in the temporary registration table 532 based on the session information extracted from respective header information at layer2 to layer4 of OSI. That is, it is unnecessary to perform checking on the header information of the RTP packet, which is complicated processing. Further, the send event is queued to the high-priority queue (high-order send FIFO 511), and a send request is issued from the queue with a higher priority, thereby enabling the high-speed processing.

If the wireless LAN interface section 4 receives a frame carrying an RTP packet from the wireless LAN 901, the device driver section 7 causes the wireless LAN interface section 4 to store the received frame into the shared buffer section 55. After the frame is stored, the device driver section 7 issues a receive request for the frame to the QoS middleware section 6 through the NDIS interface (or the socket interface).

If the QoS middleware section 6 that has received the receive request from the device driver section 7 passes control to the receiving section 62. The header comparison section 621 of the receiving section 62 checks whether session information obtained by extracting port numbers of the source and the destination, IP addresses of the source and the destination, a protocol number, and MAC addresses of the source and the destination from respective header information within the frame is registered in the temporary registration table 532 of the cache table 53 (steps S601 and S602 of FIG. 13).

Figure 13:
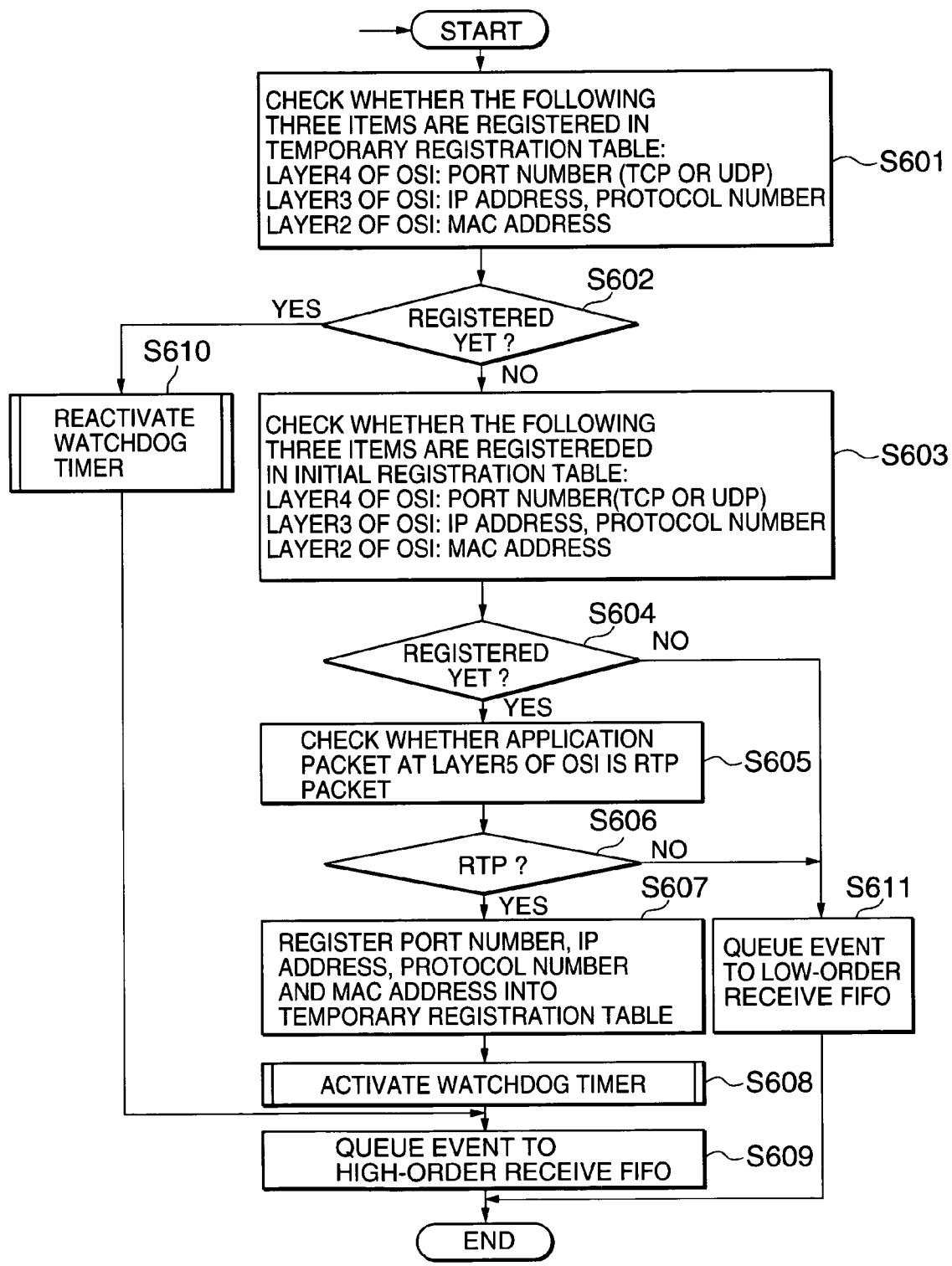
FIG. 13 is a flow chart showing an operation of a header comparison section of a receiving section shown in FIG. 10.

If the session information is not registered in the temporary registration table 532 (note that the session information of the RTP frame that is sent or received at the start is not registered therein) in step S602, the header comparison section 621 of the receiving section 62 checks whether session information obtained by extracting a port number of the source or the destination, an IP addresses of the source or the destination, a protocol number, and a MAC addresses of the source or the destination from the respective header information within the frame is registered in the initial registration table 531 of the cache table 53 (steps S603 and S604 of FIG. 13).

If the header information is registered in the initial registration table 531 in step S604, the process advances to step S605. The header comparison section 621 of the receiving section 62 checks whether a header information of a frame to be received corresponding to a header area of the RTP packet at layer5 of OSI is included in predetermined information to thereby check whether the frame to be received carries the RTP packet (steps S605 and S606).

In the case of recognizing the RTP packet from its header information in step S606, the header comparison section 621 of the receiving section 62 registers the port numbers of the source and the destination, the IP addresses of the source and the destination, the protocol number, and the MAC addresses of the source and the destination, which are extracted from respective header information within the frame to be received, as a set of session information in the temporary registration table 532 (step S607). At the same time, the header comparison section 621 causes the RTP session monitor section 13 to activate (reset and start) the timer of the watchdog timer section 54 (step S608).

The RTP session monitor section 13 in this case registers the timer identification number for the timer of the watchdog timer section 54 to be activated into an area corresponding to the session information registered within the temporary registration table 532 in step S607, and activates the timer of the watchdog timer section 54 (steps S301 and S302 of FIG. 8(1)).

After activating the timer of the watchdog timer section 54, the header comparison section 621 of the receiving section 62 directs the send request toward the high-order receive FIFO 521 as a send event, and queues the send request to the high-order receive FIFO 521 (step S609 of FIG. 13). Note that the receive event includes identification information of a receive request, a storage area within a shared buffer section 55, and length information of a frame to be relayed.

Note that if the header information within the frame to be received does not corresponds to the header area of the RTP packet in step S606, the header comparison section 621 of the receiving section 62 directs the send request toward the low-order receive FIFO 522 as the send event, and queues the send request to the low-order receive FIFO 522 (step S611).

Note that if the session information is not registered in the initial registration table 531 in step S604, the header comparison section 621 of the receiving section 62 directs the receive request toward the low-order receive FIFO 522 as the receive event, and queues the receive request to the low-order receive FIFO 522 (step S611).

Figure 14:
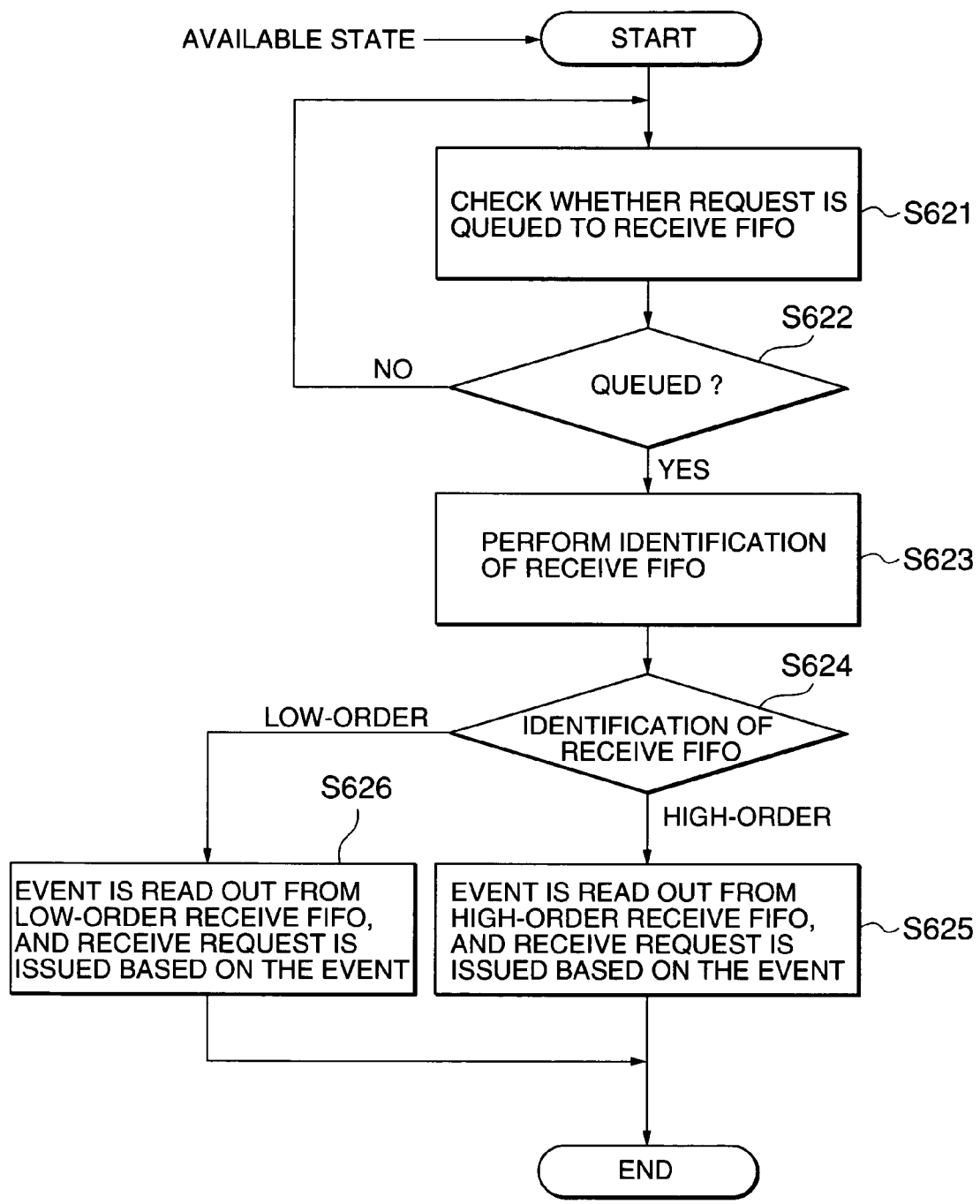
FIG. 14 is a flow chart showing an operation of a synthesis section of the receiving section shown in FIG. 10.

On the other hand, unless receiving processing is underway in the protocol stack section 3 (if the protocol stack section 3 is available), the synthesis section 122 of the receiving section 12 checks whether the receive request is queued to the receive FIFO section 52, and if the receive request is queued, identification of the receive FIFO is performed (steps S621 to S624 of FIG. 14).

If the receive request is queued to the high-order receive FIFO 521 in step S624, the synthesis section 622 of the receiving section 62 unconditionally issues a receive request to the protocol stack section 3 based on the receive event read out from the high-order receive FIFO 521 (step S625). If the receive request is not queued to the high-order receive FIFO 521 in step S624, a receive request is issued to the protocol stack section 3 according to the NDIS interface (or socket interface) based on the receive event read out from the low-order receive FIFO 522 (step S626).

The protocol stack 2 that has received the receive request performs control using a communication protocol at higher than or equal to layer3 of OSI based on the receive request.

After the first RTP packet is received as described above, in order to receive the consecutive RTP packets from the same device, the device driver section 7 issues a receive request for a subsequent RTP packet to the QoS middleware section 6.

If the session information is registered in the temporary registration table 532 in step S602, the header comparison section 621 causes the RTP session monitor section 13 to reactivate (reset and restart) the timer of the watchdog timer section 54 (step S610). At the same time, the header comparison section 611 directs the receive request toward the high-order receive FIFO 521, and queues the receive request to the high-order receive FIFO 521 (step S609).

The RTP session monitor section 13 in this case extracts the timer identification number for the timer of the watchdog timer section 54 to be activated from the temporary registration table 532, and reactivates (reset and restart) the timer (timer having the extracted timer identification number) of the watchdog timer section 54 (step S311 of FIG. 8(2)).

On the other hand, unless receiving processing is underway in the protocol stack section 3 (if the protocol stack section 3 is available), the synthesis section 622 of the receiving section 62 checks whether the receive request is queued to the receive FIFO section 52, and if the receive request is queued, identification of the receive FIFO is performed (steps S621 to S624 of FIG. 14).

As the receive request is queued to the high-order receive FIFO 521 in step S624, the synthesis section 622 of the receiving section 62 unconditionally issues a receive request to the protocol stack section 3 based on the receive event read out from the high-order receive FIFO 521 (step S625).

The protocol stack section 3 that has received the receive request from the synthesis section 622 of the receiving section 62 performs control using a communication protocol at higher than or equal to layer3 of OSI based on the receive request.

If a predetermined time has passed without receiving the consecutive RTP packets from the same device, the corresponding timer of the watchdog timer section 54 causes a time-out. Then, the RTP session monitor section 13 deletes the session information (session information corresponding to the timer identification number for the timer causing a time-out) registered in the temporary registration table 532 (step S321 of FIG. 8(3)).

As described above, in the case of receiving the consecutive RTP packets from the same device, the session information is already registered in the temporary registration table 532 of the cache table 53. Accordingly, it is only necessary to check whether there is corresponding registration in the temporary registration table 532 based on the session information extracted from respective header information at layer2 to layer4 of OSI. That is, it is unnecessary to perform checking on the header information of the RTP packet, which is complicated processing. Further, the receive event is queued to the high-priority queue (high-order receive FIFO 521), and a send request is issued from the queue with a higher priority, thereby enabling the high-speed processing.

Thus, the QoS middleware section 6 for performing priority processing using FIFOs is provided between the device driver section 7 and the protocol stack section 3 that operates based on a high-level communication protocol. Accordingly, it is possible to reduce phenomena in which high-priority communication data waits to be sent to the wireless LAN 901 and in which high-priority communication data waits to be received to the protocol stack section 3.

Also, if the session information of the first RTP packet is registered into the temporary registration table 532 of the cache table 53, the registered session information registered into the temporary registration table 532 is regarded as the one for an RTP stream (consecutive RTP frames) until the session information is not used any more. Accordingly, it is possible to put a high priority on receiving processing in a protocol stack and/or sending processing in a device driver with respect to a specific packet assigned a high priority with as small delay as possible.

Further, the respective FIFOs of the send FIFO section 51 and the receive FIFO section 52 may be allocated within a memory (for example, RAM) provided to a wireless terminal device as standard equipment, and the program for the QoS middleware section 6 and the device driver section 7 maybe installed into the wireless terminal device. By such arrangement, QoS can be provided while the current system environment is utilized as it is. At the same time, there can be obtained a cost-effectiveness, which makes it unnecessary to newly purchase QoS-capable hardware adapted in view of the wait states.

Figure 15:
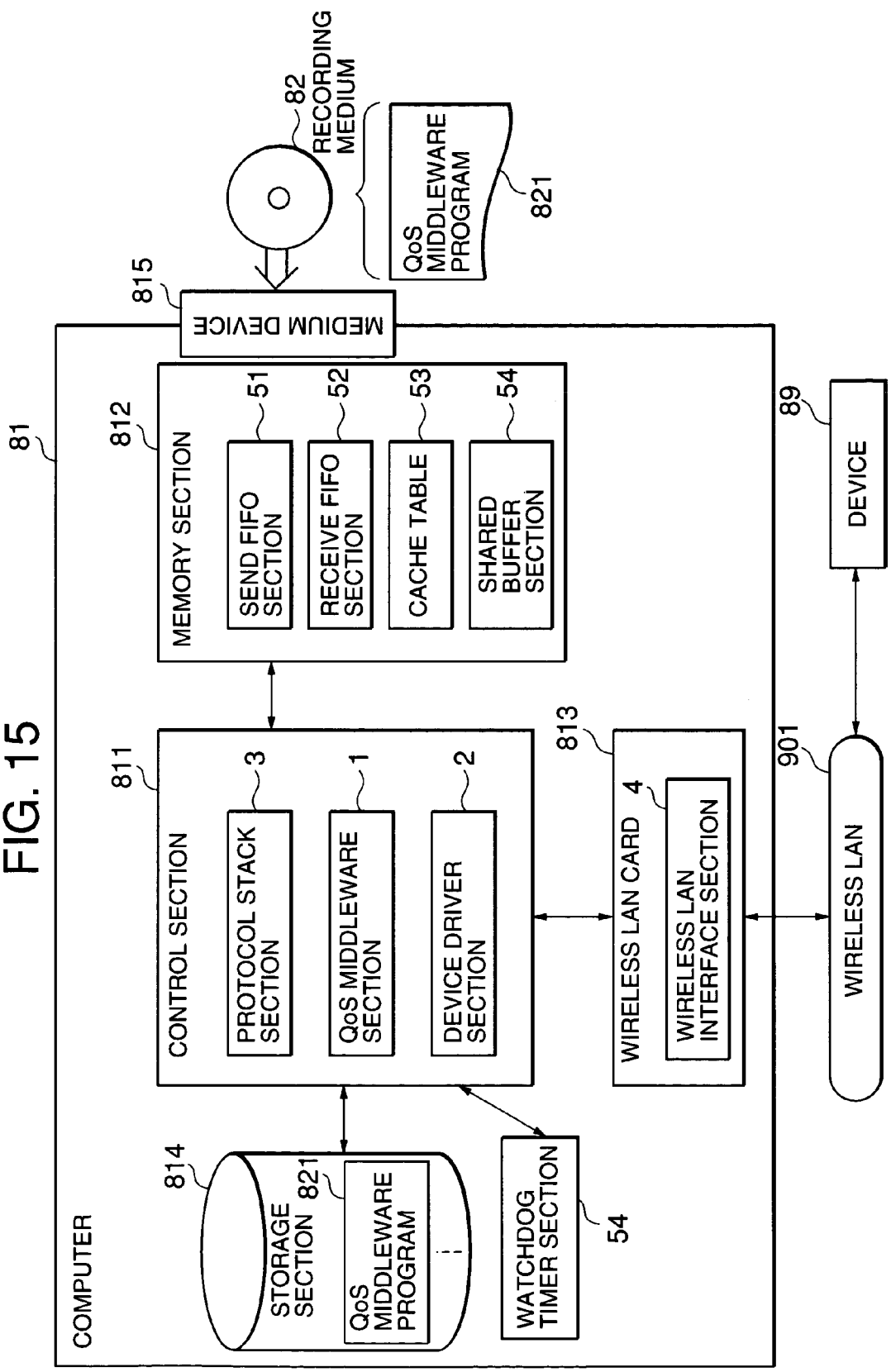
FIG. 15 is a block diagram showing a configuration of a third specific example of the present invention.

Next, description is made of a third specific example. FIG. 15 is a block diagram showing a configuration of the third specific example of the present invention.

The third specific example includes a computer 81, a recording medium 82, the device 89, and the wireless LAN 901. Examples of the recording medium 82 include a CD-R and a CD-RW. Note that the computer 81 communicates with the device 89 via the wireless LAN 901.

The recording medium 82 stores a QoS middleware program 821.

The computer 81 includes: a control section 811 that operates under program control by a not-shown processor (CPU); a memory section 812 that functions as a memory to which data can be written in and from which data can be readout (for example, RAM); a wireless LAN card 813 having wireless interface section 4; a storage section 814 that functions as a nonvolatile recording medium device (for example, magnetic disk); a medium device 815 that functions as a driver unit for the recording medium 82 (for example, CD-R device, CD-RW device, etc.); and a watchdog timer section 54.

The control section 811 includes the protocol stack section 3, the QoS middleware section 1 and the device driver section 2. In other words, in the case where a communication program stored in the storage section 814 is loaded into the a memory section 812, the protocol stack section 3, the QoS middleware section 1 and the device driver section 2 serve as a function block for causing a processor (CPU) to execute the program.

FIG. 15 shows that the storage section 814 is configured to have the QoS middleware program 821 installed therein from the recording medium 82, and stores programs including the QoS middleware section 821.

Note that the respective blocks within the control section 811 are denoted by the same reference numerals and have the same functions as in the case of the first specific example (FIG. 2), and therefore their detailed description is omitted.

Next, referring to FIG. 15, description is made of an operation of the third specific example.

Now, in order to enhance the function of a wireless LAN driver installed in the computer 81, a user sets the recording medium 82 in the medium device 815 to install the QoS middleware program 821. Then, the control section 811 of the computer 81 stores the QoS middleware program 821 into the storage section 814. After the QoS middleware program 821 is stored, the computer 81 is rebooted, and then a program including a QoS middleware program 821 is loaded to the memory section 812. Thus, the control section 811 establishes the protocol stack section 3, the QoS middleware section 1, and the device driver section 2.

Note that the respective blocks within the control section 861 after its establishment have the same operations as those described in the first specific example, and therefore their description is omitted.

Also, in the description of the third specific example, the QoS middleware program 821 is installed into the computer 81 from the recording medium 82, but the QoS middleware program 821 may be installed into the computer 86 from the device 89 via the wireless LAN 901.

Also, in the third specific example, the case of enhancing the computer 81 is described, but the device driver functioning as the QoS middleware program 821 and the device driver section 2 may be installed into the computer 81 as the a wireless LAN driver, or may be preinstalled. The operation of the processor (CPU) for executing the QoS middleware program 821 that has been installed is naturally the same as that of the processor (CPU) for executing the QoS middleware program 821 that has been enhanced.

Figure 16:
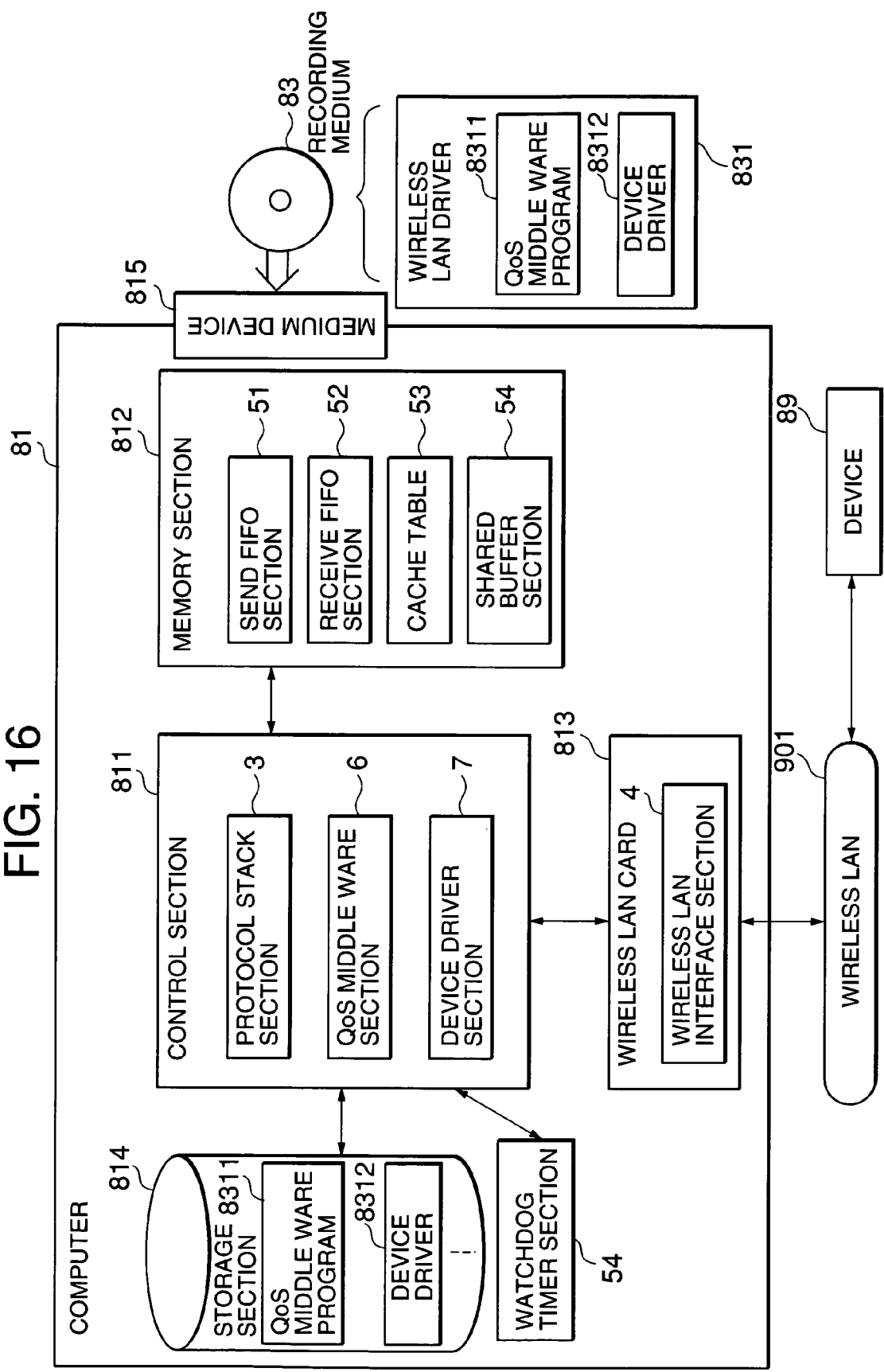
FIG. 16 is a block diagram showing a configuration of a fourth specific example of the present invention.

Next, description is made of a fourth specific example. FIG. 16 is a block diagram showing a configuration of the fourth specific example of the present invention.

The fourth specific example includes a computer 81, a recording medium 83, the device 89, and the wireless LAN 901. Examples of the recording medium 82 include a CD-R and a CD-RW. Note that the computer 81 communicates with the device 89 via the wireless LAN 901.

The recording medium 83 stores a wireless LAN driver 831 having a QoS middleware program 8311 and a device driver 8312.

The computer 81 includes: a control section 811 that operates under program control by a not-shown processor (CPU); a memory section 812 that functions as a memory to which data can be written in and from which data can be read out (for example, RAM); a wireless LAN card 813 having wireless interface section 4; a storage section 814 that functions as a nonvolatile recording medium device (for example, magnetic disk); a medium device 815 that functions as a driver unit for the recording medium 83 (for example, CD-R device, CD-RW device, etc.); and a watchdog timer section 54.

The control section 811 includes the protocol stack section 3, the QoS middleware section 6 and the device driver section 7. In other words, in the case where a communication program stored in the storage section 814 is loaded into the a memory section 812, the protocol stack section 3, the QoS middleware section 6 and the device driver section 7 serve as a function block for causing a processor (CPU) to execute the program.

FIG. 16 shows that the storage section 814 is configured to have the wireless LAN driver 831 installed therein from the recording medium 83, and stores programs including the QoS middleware program 8311 and the device driver 8312.

Note that the respective blocks within the control section 811 are denoted by the same reference numerals and have the same functions as in the case of the second specific example (FIG. 10), and therefore their detailed description is omitted.

Next, referring to FIG. 16, description is made of an operation of the fourth specific example.

Now, in order to enhance the function of a wireless LAN driver installed in the computer 81, a user sets the recording medium 82 in the medium device 815 to install the wireless LAN driver 831. Then, the control section 811 of the computer 81 stores the QoS middleware section 8311 and the device driver 8312 into the storage section 814. After the QoS middleware section 8311 and the device driver 8312 are stored, the computer 81 is rebooted, and then a program including a QoS middleware program 8311 is loaded to the memory section 12. Thus, the control section 811 establishes the protocol stack section 3, the QoS middleware section 6 and the device driver section 7.

Note that the respective blocks within the control section 811 after its establishment have the same operations as those described in the second specific example, and therefore their description is omitted.

Also, in the description of the fourth specific example, the wireless LAN driver 831 is installed into the computer 81 from the recording medium 82, but the wireless LAN driver 831 may be installed into the computer 86 from the device 89 via the wireless LAN 901.

Also, in the fourth specific example, the case of enhancing the computer 81 is described, but the wireless LAN driver 831 may be installed into the computer 81 as the first installation of a wireless LAN driver, or may be preinstalled. The operation of the processor (CPU) for executing the QoS middleware program 8311 that has been installed is naturally the same as that of the processor (CPU) for executing the QoS middleware program 8311 that has been enhanced.

Figure 17:
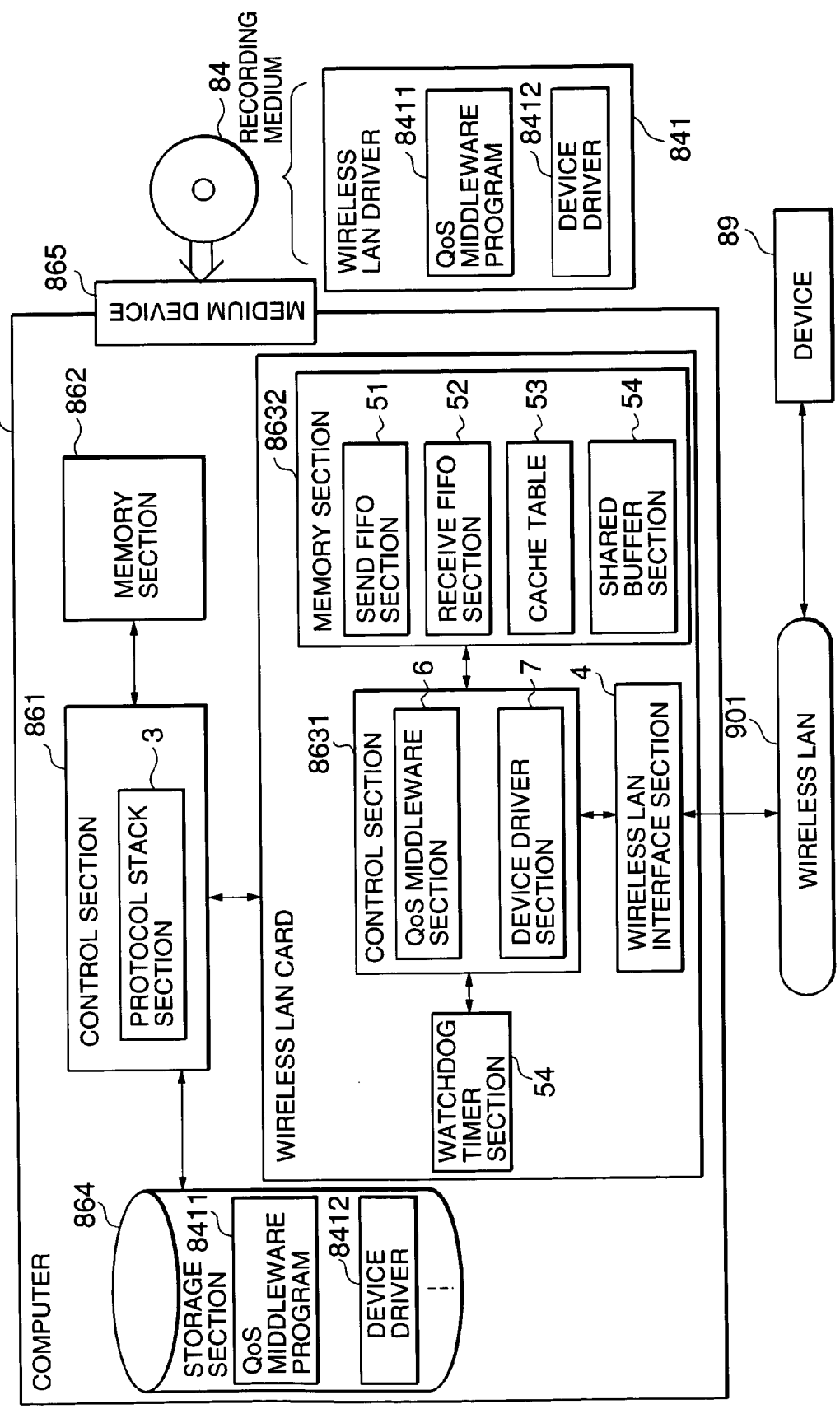
FIG. 17 is a block diagram showing a configuration of a fifth specific example of the present invention.

Next, description is made of a fifth specific example. FIG. 17 is a block diagram showing a configuration of the fifth specific example of the present invention.

The fifth specific example includes a computer 86, a recording medium 84, the device 89, and the wireless LAN 901. Examples of the recording medium 84 include a CD-R and a CD-RW. Note that the computer 86 communicates with the device 89 via the wireless LAN 901.

The recording medium 84 stores a wireless LAN driver 841 including a QoS middleware section 8411 and a device driver 8412.

The computer 86 includes: a control section 861 that operates under program control by a not-shown processor (CPU); a memory section 862 that functions as a memory to which data can be written in and from which data can be read out (for example, RAM); a wireless LAN card 863; a storage section 864 that functions as a nonvolatile recording medium device (for example, magnetic disk); and a medium device 865 that functions as a driver unit for the recording medium 84 (for example, CD-R device, CD-RW device, etc.).

The control section 861 includes the protocol stack section 3. In other words, in the case where a communication program stored in the storage section 864 is loaded into the a memory section 862, the protocol stack section 3 serves as a function block for causing a processor (CPU) to execute the program.

FIG. 17 shows that the storage section 864 is configured to have the wireless LAN driver 841 installed therein from the recording medium 84, and stores programs including the QoS middleware section 8411 and the device driver 8412.

The wireless LAN card 863 includes: a control section 8631 that operates under program control by a not-shown processor (CPU) mounted to the wireless LAN card 863; a memory section 8632 that functions as a memory to which data can be written in and from which data can be read out (for example, RAM); the wireless LAN interface section 4; and the watchdog timer section 54.

The control section 8631 includes the QoS middleware section 6 and the device driver section 7. In other words, in the case where communication programs (in this case, the QoS middleware section 8411 and the device driver 8412) stored in the storage section 864 are loaded into the memory section 8632, the QoS middleware section 6 and the device driver section 7 serve as function blocks for causing the processor (CPU) to execute the program.

Note that the respective blocks within the control section 861 and the control section 8631 are denoted by the same reference numerals and have the same functions as in the case of the second specific example (FIG. 10), and therefore their detailed description is omitted.

Next, referring to FIG. 17, description is made of an operation of the fifth specific example.

Now, in order to enhance the function of a wireless LAN driver installed in the computer 86, a user sets the recording medium 84 in the medium device 865 to install the wireless LAN driver 841. Then, the control section 861 of the computer 86 stores the QoS middleware section 8411 and the device driver 8412 into the storage section 864. After the QoS middleware section 8411 and the device driver 8412 are stored, the computer 86 is rebooted, and then a program including a protocol stack is loaded into the memory section 862. Further, the QoS middleware section 8411 and the device driver 8412 are loaded. Thus, the control section 861 establishes the protocol stack section 3, and the control section 8631 establishes the QoS middleware section 6 and the device driver section 7.

Note that the respective blocks within the control section 861 after its establishment have the same operations as those described in the second specific example, and therefore their description is omitted.

Also, in the description of the fifth specific example, the wireless LAN driver 841 is installed into the computer 86 from the recording medium 84, but the wireless LAN driver 841 may be installed into the computer 86 from the device 89 via the wireless LAN 901.

Also, in the fifth specific example, the case of enhancing the computer 86 is described, but the wireless LAN driver 841 may be installed into the computer 86 as the first installation of a wireless LAN driver, or may be preinstalled. The operation of the processor (CPU) for executing the QoS middleware section 8411 that has been installed is naturally the same as that of the processor (CPU) for executing the QoS middleware section 8411 that has been enhanced.

In the first to fifth specific examples, the wireless LAN drivers are described as examples, but the communication mechanism used is not limited to a wireless LAN. Even if the case of using another LAN communication, the same operation naturally applies to the present invention.

Further, the memory capacity for an imaginary FIFO may not be fixed, but may be allowed to vary dynamically depending on information of the cache table 53 or on utilization efficiency for the FIFO. Reading data in advance for the FIFO may be made to appear faster than the physical line speed by a predetermined formula. For example, a speed faster by 10% may be set to thereby avoid reading data in a speed far faster than the physical line speed.

As has been described above, according to the present invention, it is possible to put a high priority on receiving processing in a protocol stack and/or sending processing in a device driver with respect to a specific packet assigned a high priority with as small delay as possible.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A terminal device comprising:
a device driver section for controlling an interface section that is connected to a network;
a protocol stack section that is connected to the network via the device driver section based on a communication protocol at higher, than or equal to layer3 of OSI;
a middleware section that is interposed between the protocol stack section and the device driver section, the middleware section including a sending section that, if a send request for a frame to be sent (hereinafter, referred to as "send frame") is issued from the protocol stack section, determines a send priority of the send request based on header information at layer2 to layer4 of OSI within the send frame, and then outputs the send request to the device driver section according to the send priority determined;
a cache table in which specific session information is registered in advance; and
multiple FIFOs each corresponding to the send priority, wherein the sending section includes:
a header comparison section that, if a send request for a send frame is issued from the protocol stack section, determines a send priority of the send request by searching the cache table based on header information at layer2 to layer4 of OSI within the send frame, and then queues the send request to one of the multiple FIFOs corresponding to the send priority determined; and
a synthesis section that synthesizes send requests outputted from the multiple FIFOs according to the send priority of the one of the multiple FIFOs to which the send request is queued, and then outputs a synthesized send request to the device driver section.

2. A terminal device comprising:
a device driver section for controlling an interface section that is connected to a network;
a protocol stack section that is connected to the network via the device driver section based on a communication protocol at higher than or equal to layer3 of OSI;
a middleware section that is interposed between the protocol stack section and the device driver section, the middleware section including a sending section that, if a send request for a frame to be sent (hereinafter, referred-to as "send frame") is issued from the protocol stack section, determines a send priority of the send request based on header information at layer2 to layer4 of OSI within the send frame, and then outputs the send request to the device driver section according to the send priority determined, the middleware section further including a receiving section that, if a receive request for a frame to be received (hereinafter, referred to as "receive frame") is issued from the device driver section, determines a receive priority of the receive request based on header information at layer2 to layer4 of OSI within the receive frame, and then outputs the receive request to the protocol stack section according to the receive priority determined;
a cache table in which specific session information is registered in advance; and
multiple FIFOs each corresponding to the receive priority,
wherein the receiving section includes:
a header comparison section that, if a receive request for a receive frame is issued from the device driver section, determines a receive priority of the receive, request by searching the cache table, based on header information at layer2 to layer4 of OSI within the receive frame, and then queues the receive request to one of the multiple FIFOs corresponding to the receive priority determined; and
a synthesis section that synthesizes receive requests outputted from the multiple FIFOs according to the receive priority of the one of the multiple FIFOs to which the receive request is queued, and then outputs a synthesized receive request to the protocol stack section.

3. A terminal device, comprising:
a device driver section for controlling an interface section that is connected to a network;
a protocol stack section that is connected to the network via the device driver section based on a communication protocol at higher than or equal to layer3 of OSI; and
a middleware section that is interposed between the protocol stack section and the device driver section;
wherein the middleware section includes a sending section that:
if a send request to a predetermined destination for a specific packet defined by a communication protocol at higher than or equal to layer5 of OSI is issued from the protocol stack section in advance and if the send request is a first one of consecutive send requests, checks on header information of the specific packet, then registers into the cache table session information extracted from headers at layer2 to layer4 of OSI within a send frame carrying the specific packet, raises a send priority of the send request, and outputs the send request to the device driver section; and if the send request is among the consecutive quests other than the first one and if session information extracted from headers at layer2 to layer4 of OSI within a send frame carrying the specific packet is registered in the cache table, raises a send priority of the send request, and outputs the send request to the device driver section.

4. A terminal device according to claim 3, wherein the middleware section further includes a receiving section that:

if a receive request from a predetermined source for a specific packet defined by a communication protocol at higher than or equal to layer5 of OSI is issued from the device driver section in advance and if the receive request is a first one of consecutive receive requests, checks on header information of the specific packet, then registers into the cache table session information extracted from headers at layer2 to layer4 of OSI within a receive frame carrying the specific packet, raises a receive priority of the receive request, and outputs the receive request to the protocol stack section; and if the receive request is among the consecutive receive requests other than the first one and if session information extracted from headers at layer2 to layer4 of OSI within a receive frame carrying the specific packet is registered in the cache table, raises a receive priority of the receive request, and outputs the receive request to the protocol stack section.

5. A terminal device according to claim 3, wherein the middleware section further includes a monitor section that:

if the session information is registered into the cache table, monitors the cache table; and if the send request for a send frame carrying the session information is not issued from the protocol stack section within a predetermined time, delete the session information within the cache table.

6. A terminal device according to claim 4, wherein the middleware section further includes a monitor section that:

if the session information is registered into the cache table, monitors the cache table; and if the receive request for a receive frame carrying the session information is not issued from the device driver section within a predetermined time, delete the session information within the cache table.

7. A terminal device, comprising:

a device driver section for controlling an interface section that is connected to a network;

a protocol stack section that is connected to the network via the device driver section based on a communication protocol at higher than or equal to layer3 of OSI;

a middleware section that is interposed between the protocol stack section and the device driver section;

a first cache table in which a first session information is previously registered;

a second cache table that is used upon establishment of a session;

a first FIFO section for storing high-priority send data in a FIFO format; and a second FIFO section for storing low-priority send data in a FIFO format, wherein the middleware section includes:

a first checking means for, if a send request for a send frame is issued from the protocol stack section, checking whether a second session information that is extracted from headers at layer2 to layer4 of OSI within the send frame is registered in the second cache table;

a first queueing means for, if the first checking means determines that the second session information is registered, queueing the send request to the first FIFO section;

a second checking means for, if the first checking means determines that the second session information is not registered, checking whether the second session information is registered in the first cache table;

a third checking means for, if the second checking means determines that the second session information is registered, checking whether the send frame includes a predetermined specific packet at higher than or equal to layer5 of OSI;

a second queueing means for, if the third checking means determines that the send frame includes the predetermined specific packet, judging that a high-priority session is established, registering the second session information into the second cache table, and queueing the, send request to the first FIFO section;

a third queueing means for, if the second checking means determines that the second session information is not registered, queueing the send request to the second FIFO section; and send-requesting means for outputting to the device driver section the send request queued to the first FIFO section prior to the send request queued to the second FIFO section.

8. A terminal device according to claim 7, comprising:

a third FIFO section for storing high-priority receive data in a FIFO format; and a fourth FIFO section for storing low-priority receive data in a FIFO format;

wherein the middleware section includes:

a fourth checking means for, if a receive request for a receive frame is issued from the device driver section, checking whether a third session information that is extracted from headers at layer2 to layer4 of OSI within the receive frame is registered in the second cache table;

a fourth queueing means for, if the fourth checking means determines, that the third session information is registered, queueing the receive request to the third FIFO section;

a fifth checking means for, if the fourth checking means determines that the third session information is not registered, checking whether the third session information is registered in the first cache table;

a sixth checking means for, if the fifth checking means determines that the third session information is registered, checking whether the receive frame includes a specific packet;

a fifth queueing means for, if the sixth checking means determines that the receive frame includes the specific packet, judging that a high-priority session is established, registering the third session information into the second cache table, and queueing the receive request to the third FIFO section;

a sixth queueing means for, if the fifth checking means determines that the third session information is not registered, queueing the receive request to the fourth FIFO section; and receive-requesting means for outputting to the protocol stack section the receive request queued to the third FIFO section prior to the receive request queued to the fourth FIFO section.

9. A terminal device according to claim 7, wherein the middleware section further includes monitor means for:
if the second session information is registered into the second cache table, monitoring the second cache table; and
if the send request for a send frame carrying the second session information is not issued from the protocol stack section within a predetermined time, deleting the second session information within the second cache table.

10. A terminal device according to claim 8, wherein the middleware section further includes monitor means for:
if the third session information is registered into the second cache table, monitoring the second cache table; and
if the receive request for a receive frame carrying the third session information is not issued from the device driver section within a predetermined time, deleting the third session information within the second cache table.

11. A terminal device according to claim 3, wherein the specific packet is a packet defined by a communication protocol at higher than or equal to layer5 of OSI, which includes an RTP packet.

12. A terminal device according to claim 1, wherein the session information includes a MAC address corresponding to layer2 of OSI, a protocol number and an IP address corresponding to layer3 of OSI, and a port number corresponding to layer4 of OSI.

13. A terminal device according to claim 7, wherein the first session information and the second session information include a MAC address corresponding to layer2 of OSI, a protocol number and an IP address corresponding to layer3 of OSI, and a port number corresponding to layer4 of OSI.

14. A terminal device according to claim 8, wherein the third session information includes a MAC address corresponding to layer2 of OSI, a protocol number and an IP address corresponding to layer3 of OSI, and a port number corresponding to layer4 of OSI.

15. A method for processing communication data inside a terminal device that includes: a device driver section for controlling an interface section that is connected to a network; and a protocol stack section that is connected to the network via the device driver section based on a communication protocol at higher than or equal to layer3 of OSI, the method comprising:
if a send request for a send frame is issued from the protocol stack section, determining a send priority of the send request based on header information at layer2 to layer4 of OSI within the send frame;
outputting the scud request to the device driver section according to the send priority determined;
if a send request for the send frame is issued from the protocol stack section, determining a send priority of the send request by searching a cache table in which high-priority session information is previously registered based on respective header information at layer2 to layer4 of OSI within the send frame;
queueing the send request to one of the multiple FIFOs each corresponding to the send priority according to the send priority determined; and
synthesizing send requests outputted from the multiple FIFOs according to the send priority of the one of the multiple FIFOs to which the send request is queued, and outputting a synthesized send request to the device driver section.

16. A method for processing communication data inside a terminal device that includes: a device driver section for controlling an interface section that is connected to a network; and a protocol stack section that is connected to the network via the device driver section based on a communication protocol at higher than or equal to layer3 of OSI, the method comprising:
if a send request for a send frame is issued from the protocol stack section, determining a send priority of the send request based on header information at layer2 to layer4 of OSI within the send frame;
outputting the send request to the device driver section according to the send priority determined;
if a receive request for a receive frame is issued from the device driver section, determining a receive priority of the receive request based on respective header information at layer2 to layer4 of OSI within the receive frame; and
outputting the receive request to the protocol stack section according to the receive priority determined;
if a receive request for the receive frame is issued from the device driver section, determining a receive priority of the receive request by searching a cache table in which high-priority session information is previously registered based on respective header information at layer2 to layer4 of OSI within the receive frame;
queueing the receive request to one of the multiple FIFOs each corresponding to the receive priority according to the receive priority determined; and
synthesizing receive requests outputted from the multiple FIFOs according to the receive priority of the one of the multiple FIFOs to which the receive request is queued, and outputting a synthesized receive request to the protocol stack section.

17. A method for processing communication data inside a terminal device that includes: a device driver section for controlling an interface section that is connected to a network; and a protocol stack section that is connected to the network via the device driver section based on a communication protocol at higher than or equal to layer3 of OSI, the method comprising:
if a send request to a predetermined destination for a specific packet defined by a communication protocol at higher than or equal to layer5 of OSI is issued from the protocol stack section in advance and if the send request is a first one of consecutive send requests, checking on header information of the specific packet, then registering into a cache table session information extracted from headers at layer2 to layer4 of OSI within a send frame carrying the specific packet, raising a send priority of the send request, and outputting the send request to the device driver section; and
if the send request is among the consecutive send requests other than the first one and if session information extracted from headers at layer2 to layer4 of OSI within a send frame carrying the specific packet is registered in the cache table, raising a send priority of the send request, and outputting the send request to the device driver section.

18. A method for processing communication data inside a terminal device according to claim 17, further comprising:
if a receive request from a predetermined source for a specific packet defined by a communication protocol at higher than or equal to layer5 of OSI is issued from the device driver section in advance and if the receive request is a first one of consecutive receive requests, checking on header information of the specific packet, then registering into a cache table session information extracted from headers at layer2 to layer4 of OSI within a receive frame carrying the specific packet, raising a receive priority of the receive request, and outputting the receive request to the protocol stack section; and if the receive request is among the consecutive receive requests other than the first one and if session information extracted from headers at layer2 to layer4 of OSI within a receive frame carrying the specific packet is registered in the cache table, raising a receive priority of the receive request, and outputting the receive request to the protocol stack section.

19. A method for processing communication data inside a terminal device according to claim 17, further comprising:

if the session information is registered into the cache table, monitoring the cache table; and if the send request for a send frame carrying the session information is not issued from the protocol stack section within a predetermined time, deleting the session information within the cache table.

20. A method for processing communication data inside a terminal device according to claim 18, further comprising:

if the session information is registered into the cache table, monitoring the cache table; and if the receive request for a receive frame carrying the session information is not issued from the device driver section within a predetermined time, deleting the session information within the cache table.

21. A method for processing communication data inside a terminal device that includes: a device driver section for controlling an interface section that is connected to a network; and a protocol stack section that is connected to the network via the device driver section based on a communication protocol at higher than or equal to layer3 of OSI, the method comprising:

if a send request for a send frame is issued from the protocol stack section, checking whether a first session information that is extracted from headers at layer2 to layer4 of OSI within the send frame is registered in a second cache table that is used upon establishment of a session;

if the first session information is registered in the second cache table, queueing the send request to a first FIFO section for storing high-priority send data in a FIFO format;

if the first session information is not registered in the second cache table, checking whether the first session information is registered in a first cache table in which a second session information is previously registered;

if the first session information is registered in the first cache table, checking whether the send frame includes a predetermined specific packet at higher than or equal to layer5 of OSI;

if the send frame includes the predetermined specific packet, judging that a high-priority session is established, registering the first session information into the second cache table, and queueing the send request to the first FIFO section;

if the first session information is not registered in the first cache table, queueing the send request to a second FIFO section for storing low-priority send data in a FIFO format; and outputting to the device driver section the send request queued to the first FIFO section prior to the send request queued to the second FIFO section.

22. A method for processing communication data inside a terminal device according to claim 21, further comprising:

if a receive request for a receive frame is issued from the device driver section, checking whether a third session information that is extracted from headers at layer2 to layer4 of OSI within the receive frame is registered in a second cache table;

if the third session information is registered in the second cache table, queueing the receive request to a third FIFO section for storing high-priority receive data in a FIFO format;

if the third session information is not registered in the second cache table, checking whether the third session information is registered in a first cache table;

if the third session information is registered in the first cache table, checking whether the receive frame includes a specific packet;

if the receive frame includes the specific packet, judging that a high-priority receive session is established, registering the third session information into the second cache table, and queueing the receive request to the third FIFO section;

if the third session information is not registered in the first cache table, queueing the receive request to a fourth FIFO section for storing low-priority receive data in a FIFO format; and outputting to the protocol stack section the receive request queued to the third FIFO section prior to the receive request queued to the fourth FIFO section.

23. A method for processing communication data inside a terminal device according to claim 21, further comprising:

if the first session information is registered into the second cache table, monitoring the second cache table; and if the send request for a send frame carrying the first session information is not issued from the protocol stack section within a predetermined time, deleting the first session information within the second cache table.

24. A method for processing communication data inside a terminal device according to claim 22, further comprising:

if the third session information is registered into the second cache table, monitoring the second cache table; and if the receive request for a receive frame carrying the third session information is not issued from the device driver section within a predetermined time, deleting the third session information within the second cache table.

25. A method for processing communication data inside a terminal device according to claim 17, wherein the specific packet is a packet defined by a communication protocol at higher than or equal to layer5 of OSI, which includes an RTP packet.

26. A method for processing communication data inside a terminal device according to claim 15, wherein the session information includes a MAC address corresponding to layer2 of OSI within a frame, a protocol number and an IP address corresponding to layer3 of OSI, and a port number corresponding to layer4 of OSI.

27. A method for processing communication data inside a terminal device according to claim 21, wherein the first and the second session information includes a MAC address corresponding to layer2 of OSI within a frame, a protocol number and an IP address corresponding to layer3 of OSI, and a port number corresponding to layer4 of OSI.

28. A method for processing communication data inside a terminal device according to claim 22, wherein the third session information includes a MAC address corresponding to layer2 of OSI within a frame, a protocol number and an IP address corresponding to layer3 of OSI, and a port number corresponding to layer4 of OSI.

29. A computer-readable medium storing a program for executing a program controlled computer that includes: a device driver section for controlling an interface section that is connected to a network; and a protocol stack section that is connected to the network via the device driver section based on a communication protocol at higher than or equal to layer3 of OSI, the stored program causing the program-controlled computer to perform:
  a process for, if a send request to a predetermined destination for a specific packet defined by a communication protocol at higher than or equal to layer5 of OSI is issued from the protocol stack section in advance and if the send request is a first one of consecutive send requests, checking on header information of the specific packet, then registering into a cache table session information extracted from headers at layer2 to layer4 of OSI within a send frame carrying the specific packet, raising a send priority of the send request, and outputting the send request to the device driver section; and
  a process for, if the send request is among the consecutive send requests other than the first one and if session information extracted from headers at layer2 to layer4 of OSI within a send frame carrying the specific packet is registered in the cache table, raising a send priority of the send request, and outputting the send request to the device driver section.

30. A computer readable medium according to claim 29 the stored program further causing the computer to perform:
  a process for, if a receive request from a predetermined source for a specific packet defined by a communication protocol at higher than or equal to layer5 of OSI is issued from the device driver section in advance and if the receive request is a first one of consecutive receive requests, checking on header information of the specific packet, then registering into a cache table session information extracted from headers at layer2 to layer4 of OSI within a receive frame carrying the specific packet, raising a receive priority of the receive request, and outputting the receive request to the protocol stack section; and
  a process for, if the receive request is among the consecutive receive requests other than the first one and if session information extracted from headers at layer2 to layer4 of OSI within a receive frame carrying the specific packet is registered in the cache table, raising a receive priority of the receive request, and outputting the receive request to the protocol stack section.

31. A computer readable medium according to claim 29, the stored program further causing the computer to preform:
  a process for, if the session information is registered into the cache table, monitoring the cache table; and
  a process for, if the send request for a send frame carrying the session information is not issued from the protocol stack section within a predetermined time, deleting the session information within the cache table.

32. A computer readable medium according to claim 30, the stored program further causing the computer to preform:
  a process for, if the session information is registered into the cache table, monitoring the cache table; and
  a process for, if the receive request for a receive frame carrying the session information is not issued from the device driver section within a predetermined time, deleting the session information within the cache table.

33. A computer-readable medium storing a program for executing a program controlled computer that includes: a device driver section for controlling an interface section that is connected to a network; a protocol stack section that is connected to the network via the device driver section based on a communication protocol at higher than or equal to layer3 of OSI; a first cache table in which a first session information is previously registered; a second cache table that is used upon establishment of a session; a first FIFO section for storing high-priority send data in a FIFO format; and a second FIFO section for storing low-priority send data in a FIFO format, the stored program causing the program-controlled computer to preform:
  a process for, if a send request for a send frame is issued from the protocol stack section, checking whether a second session information that is extracted from respective headers at layer2 to layer4 of OSI within the send frame is registered in the second cache table;
  if the second session information is registered in the second cache table, queueing the send request to the first FIFO section;
  a process for, if the second session information is not registered in the second cache table, checking whether the second session information is registered in the first cache table;
  a process for, if the second session information is registered in the first cache table, checking whether the send frame includes a predetermined specific packet at higher than or equal to layer5 of OSI;
  a process for, if the send frame includes the predetermined specific packet, judging that a high-priority session is established, registering the second session information into the second cache table, and queueing the send request to the first FIFO section;
  a process for, if the second session information is not registered in the first cache table, queueing the send request to the second FIFO section; and
  a process for outputting to the device driver section the send request queued to the first FIFO section prior to the send request queued to the second FIFO section.

34. A computer readable medium according to claim 33, the stored program further causing the computer to preform:
  a process for, if a receive request for a receive frame is issued from the device driver section, checking whether a third session information that is extracted from respective headers at layer2 to layer4 of OSI within the receive frame is registered in the second cache table;
  if the third session information is registered in the second cache table, queueing the receive request to the third FIFO section for storing high-priority receive data in a FIFO format;
  a process for, if the third session information is not registered in the second cache table, checking whether the third session information is registered in the first cache table;
  a process for, if the third session information is registered in the first cache table, checking whether the receive frame includes a specific packet;
  a process for, if the receive frame includes the predetermined specific packet, judging that a high-priority session is established, registering the third session information into the second cache table, and queueing the receive request to the third FIFO section;
  a process for, if the third session information is not registered in the first cache table, queueing the receive request to the fourth FIFO section for storing low-priority send data in a FIFO format; and a process for outputting to the protocol stack section the receive request queued to the third FIFO section prior to the receive request queued to the fourth FIFO section.

35. A computer readable medium according to claim 33, the stored program further causing the computer to preform:

a process for, if the second session information is registered into the second cache table, monitoring the second cache table; and a process for, if the send request for a send frame carrying the second session information is not issued from the protocol stack section within a predetermined time, deleting the second session information within the second cache table.

36. A computer readable medium according to claim 34, the stored program further causing the computer to preform:

a process for, if the third session information is registered into the second cache table, monitoring the second cache table; and a process for, if the receive request for a receive frame carrying the third session information is not issued from the device driver section within a predetermined time, deleting the third session information within the second cache table.

37. A computer readable medium according to claim 29, the stored program further causing the computer to preform:

a process for, if the send request is sent to the device driver section, outputting the send request via a program interface with respect to the protocol stack section.

38. A computer readable medium program according to claim 30, the stored program further causing the computer to preform:

a process for, if the receive request is received from the device driver section, receiving the receive request via a program interface with respect to the protocol stack section.

* * * * *